United States Patent
Xu et al.

(10) Patent No.: US 11,659,435 B2
(45) Date of Patent: May 23, 2023

(54) NETWORK CONGESTION CONTROL METHOD, APPARATUS, AND SYSTEM

(71) Applicant: Huawei Technologies Co., Ltd., Guangdong (CN)

(72) Inventors: Cong Xu, Beijing (CN); Haibo Zhang, Beijing (CN); Guoping Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/947,718

(22) Filed: Aug. 13, 2020

(65) Prior Publication Data

US 2021/0007004 A1    Jan. 7, 2021

Related U.S. Application Data

(63) Continuation of application No. PCT/CN2019/075055, filed on Feb. 14, 2019.

(30) Foreign Application Priority Data

Feb. 14, 2018  (CN) .......................... 201810151212.8

(51) Int. Cl.
*H04W 28/02* (2009.01)
*H04W 28/22* (2009.01)
*H04W 28/26* (2009.01)

(52) U.S. Cl.
CPC ............ *H04W 28/0289* (2013.01); *H04W 28/0236* (2013.01); *H04W 28/22* (2013.01); *H04W 28/26* (2013.01)

(58) Field of Classification Search
CPC ......... H04W 28/0289; H04W 28/0236; H04W 28/22; H04W 28/26
See application file for complete search history.

(56) References Cited

U.S. PATENT DOCUMENTS 6,075,769 A    6/2000   Ghanwani et al.
6,965,943 B1   11/2005  Golestani
(Continued)

FOREIGN PATENT DOCUMENTS

CN    101969406 A    2/2011
CN    103391253 A    11/2013
(Continued)

OTHER PUBLICATIONS

Inho Cho et al., "ExpressPass: End-to-End Credit-based Congestion Control for Datacenters", arXiv:1610.04688v1 [cs.NI] Oct. 15, 2016, total 8 pages.
Ian F. Akyildiz et al., "TCP-Peach: A New Congestion Control Scheme for Satellite IP Networks", IEEE/ACM Transactions on Networking, vol. 9, No. 3, Jun. 2001, pp. 307-321.
(Continued)

*Primary Examiner* — Chi H Pham
*Assistant Examiner* — Weibin Huang
(74) *Attorney, Agent, or Firm* — Womble Bond Dickinson (US) LLP

(57) ABSTRACT

Embodiments of the present disclosure provide a network congestion control method, where the method includes: sending, by a transmit end device, forward probe packets to a destination device at a preset initialized rate, where some or all of the forward probe packets arrive at the destination device after being rate-limited forwarded by using a reserved bandwidth of an egress port of an intermediate device in a network; receiving return probe packets returned by the destination device, where the return probe packets correspond to the probe packets received by the destination device; and determining a data packet sending rate based on the received return probe packets, and sending a data packet at the data packet sending rate.

42 Claims, 12 Drawing Sheets

(56) References Cited

U.S. PATENT DOCUMENTS

| | | | |
|---|---|---|---|
| 2004/0185887 A1* | 9/2004 | Wolman | H04W 92/18 455/516 |
| 2005/0047340 A1* | 3/2005 | Babiarz | H04L 47/2441 370/395.2 |
| 2008/0267073 A1* | 10/2008 | Thaler | H04L 47/28 370/236 |
| 2009/0175191 A1* | 7/2009 | Lin | H04L 43/0894 370/253 |
| 2010/0008363 A1* | 1/2010 | Ee | H04L 45/72 370/392 |
| 2011/0032935 A1* | 2/2011 | Yang | H04W 8/04 370/389 |
| 2013/0124753 A1 | 5/2013 | Ansari et al. | |
| 2016/0191362 A1* | 6/2016 | Hwang | H04L 47/196 370/253 |
| 2017/0289048 A1* | 10/2017 | Chao | H04L 43/0864 |
| 2018/0034740 A1 | 2/2018 | Beliveau et al. | |

FOREIGN PATENT DOCUMENTS

| | | | | |
|---|---|---|---|---|
| CN | 104158760 | A | 11/2014 | |
| CN | 105357138 | A | 2/2016 | |
| CN | 105406915 | A | 3/2016 | |
| CN | 105978822 | A | 9/2016 | |
| CN | 107070794 | A | 8/2017 | |
| EP | 1632059 | B1 * | 8/2007 | H04L 47/10 |

OTHER PUBLICATIONS

Li Hong et al., "Transmission Control Strategy for Wired/Wireless Mixed Networks", Computer Engineering, vol. 35, Issue 14, Jul. 31, 2009, total 3 pages. With English abstract.

Xu Weiqiang et al., "Cross-Layer Optimal Congestion Control Scheme in Mobile Ad Hoc Networks", Journal of Software, vol. 21, No. 7, Jul. 2010, pp. 1667-1678, With English abstract.

* cited by examiner

NETWORK CONGESTION CONTROL METHOD, APPARATUS, AND SYSTEM

CROSS-REFERENCE TO RELATED APPLICATIONS

This application is a continuation of International Application No. PCT/CN2019/075055, filed on Feb. 14, 2019, which claims priority to Chinese Patent Application No. 201810151212.8, filed on Feb. 14, 2018, the disclosures of which are incorporated herein by reference in their entireties.

TECHNICAL FIELD

The present disclosure relates to the field of network transmission, and in particular, to a network congestion control method, apparatus, and system.

BACKGROUND

In congestion control of a conventional transmission control protocol (TCP) protocol, a network congestion status is detected based on a congestion signal, such as a packet loss, to control a packet sending rate at a source end. When the source end does not detect a packet loss, the source end blindly increases a data packet sending rate. When the source end detects a packet loss, the source end reduces a size of a sending window by half, to reduce the packet sending rate and relieve network congestion. Such a congestion control policy is a "hindsight" mechanism. When the source end receives a packet loss signal, congestion already occurs in the network, that is, a performance loss is already caused, and subsequent rate decrease adjustment is already later than a time point of the network congestion. In this mechanism, congestion constantly occurs in the network, and packets are constantly overstocked in an output queue of a router. Queue duration in the overstock queue severely deteriorates an end-to-end latency of data transmission. In addition, a packet transmission solution of blind attempting causes excessively slow convergence in the conventional TCP protocol. Because an end side cannot accurately obtain a load status of a network link, a packet sending rate is repeatedly increased/decreased near a policy convergence point (a packet loss point) through attempting in an additive increase multiplicative decrease (AIMD) manner, to explore a proper sending rate and form a sawtooth wave. Consequently, network resource utilization is reduced.

To resolve a problem in congestion control in the conventional TCP, an end-to-end collaborative congestion control policy is widely used in the industry. During execution of this policy, in addition to end side devices (e.g., a source device and a destination device), an intermediate network device (a router or a switch) also participates in adjustment of a data packet sending rate, and feeds back a current load status of the network device in real time. With participation of the intermediate network, a network congestion status can be more accurately perceived in real time in this type of congestion control policy, and a packet sending rate is controlled more accurately than that in a congestion control policy only on an end side.

However, with the participation of the network intermediate device, a key problem that needs to be resolved in end-to-end congestion control is that a congestion control mechanism cannot be widely applied due to asymmetric forward and return paths. In a relatively special scenario such as a data center network (DCN), symmetric forward and return paths can be satisfied by using a consistency adjustment hash algorithm on the switch. However, in a more general scenario such as a wide area network (WAN), not all switches are managed and controlled by the switches. Therefore, the symmetric forward and return paths cannot be controlled by using the same method. Therefore, the existing end-to-end collaborative congestion control policy is mainly limited to the data center network scenario, and the application scenario is greatly limited.

SUMMARY

To perform network congestion control in more network scenarios, embodiments of the present disclosure provide a network congestion control method, apparatus, and system.

According to one aspect, a network congestion control method is provided. The method includes:

sending, by a transmit end device, forward probe packets to a destination device at a preset initialized rate, where some or all of the forward probe packets arrive at the destination device after being rate-limited forwarded by an intermediate device in a network by using a reserved bandwidth of an egress port of the intermediate device; receiving return probe packets returned by the destination device, where the return probe packets correspond to probe packets received by the destination device; and determining a data packet sending rate based on the received return probe packets, and sending a data packet at the sending rate.

In one embodiment, the data packet sending rate is determined based on the received return probe packets, and the data packet is sent at the sending rate. In a solution of this step, the transmit end may send one data packet each time one return probe packet is received.

In another embodiment, a quantity n of to-be-sent data packets corresponding to each return probe packet is calculated based on an average packet length of the data packets in the network, a packet length of the return probe packet, and a percentage of the reserved bandwidth of the egress port of the intermediate device in the network in a total bandwidth of the egress port, where n is a natural number, a packet length of the return probe packet is the same as a packet length of the forward probe packet. In one embodiment, n is calculated according to a formula $$n = \lceil \frac{S_{credit}}{S_{data} \cdot r_{tar}} \rceil,$$

where $r_{tar}$ is the percentage of the reserved bandwidth of the egress port of the intermediate device in the network in the total bandwidth of the egress port, $S_{data}$ is the average packet length of the data packets in the network, $S_{credit}$ is the packet length of the return probe packet, and $$\lceil \frac{S_{credit}}{S_{data} \cdot r_{tar}} \rceil$$

indicates that $$\frac{S_{credit}}{S_{data} \cdot r_{tar}}$$

is rounded up.

In one embodiment, a packet loss rate of the forward probe packets in a preset period may be calculated based on a quantity of received return probe packets and a quantity of sent forward probe packets in the period, and the data packet sending rate is determined based on the packet loss rate and the initialized rate.

In one embodiment, the control method may further include: periodically adjusting, by the transmit end device, a sending rate of the forward probe packets in a next period based on a packet loss rate of forward probe packets in one period, where the packet loss rate of the forward probe packets is obtained by the transmit end through calculation based on the quantity of returned return probe packets that are received by the transmit end and the quantity of sent forward probe packets in the period.

In one embodiment, the preset period is N round-trip time (RTT) periods, and N is an integer greater than or equal to 1.

In one embodiment, the preset period may alternatively be determined based on a latency requirement of a service flow.

In one embodiment, the adjusting a sending rate of the forward probe packets may be implemented as follows:

comparing a packet loss rate of the forward probe packets with a target packet loss rate in a current period; and performing different rate adjustment on the sending rate of the forward probe packets based on a comparing result.

If the packet loss rate of the forward probe packets is less than the target packet loss rate, the sending rate of the forward probe packets in the next period is increased. In one embodiment, when the sending rate of the forward probe packets in the next period needs to be increased, the sending rate of the forward probe packets in the next period is calculated according to a formula: next_rate=cur_rate×[1+(tar_loss−cur_loss)×(max_rate−cur_rate)/cur_rate].

If the packet loss rate of the forward probe packets is higher than the target packet loss rate, the sending rate of the forward probe packets in the next period is decreased. In one embodiment, when the sending rate of the probe packets in the next period needs to be decreased, the sending rate of the probe packets is calculated according to a formula: next_rate=cur_rate×[1−(cur_loss−tar_loss)×max_rate/(max_rate−cur_rate)], where cur_rate is a probe packet sending rate in the current period, next_rate is a preset probe packet sending rate in the next period, tar_loss is the target packet loss rate of the probe packets, cur_loss is the packet loss rate of the probe packets in the current period, and max_rate is a maximum sending rate allowed in the network.

According to another aspect, a first-round data packet sending method is provided, where the method includes:

A transmit end device initializes first-round sending rates of probe packets and data packets based on an application bandwidth requirement, where the first-round sending rate of the probe packets is higher than the first-round sending rate of the data packets. In one embodiment, the first-round sending rate of the probe packets is usually higher than the application bandwidth requirement, while the first-round sending rate of the data packets is lower than the application bandwidth requirement. The probe packets and the data packets are sent to a destination device at the respective first-round sending rates.

When probe packets returned by the destination device are received, first-round sending of the data packets is ended.

During initial data transmission, the transmit end device does not need to wait for a returned probe packet, and may directly transmit the data packets at a relatively low rate while transmitting the probe packets the first time. In this way, a one-RTT handshake latency is reduced in first-round data transmission, and small flow transmission performance is improved in a scenario such as a WAN network.

According to another aspect, a network congestion control method is provided, and the method includes: sending, by a transmit end device, forward probe packets at a preset initialized rate; discarding, by an intermediate device in a network based on a reserved bandwidth of an egress port of the intermediate device, a forward probe packet whose sending rate exceeds the reserved bandwidth, and performing rate-limited forwarding on the forward probe packets; receiving, by a destination device, the forward probe packets forwarded by the intermediate device; returning, by the destination device, return probe packets to the transmit end device, where the return probe packets correspond forward probe packets received by the destination device; receiving, by the transmit end device, the return probe packets; and determining, by the transmit end device, a data packet sending rate based on the received return probe packets, and sending a data packet at the sending rate.

In one embodiment, the method further includes:

forwarding, by the intermediate device in the network, the return probe packets by using a regular bandwidth of the egress port of the intermediate device, where the regular bandwidth is a bandwidth other than the reserved bandwidth, the regular bandwidth is greater than an application-layer bandwidth requirement, and the reserved bandwidth is less than the application-layer bandwidth requirement.

In one embodiment, a sending priority of the return probe packets is set to a highest priority.

In one embodiment, the determining, by the transmit end device, a data packet sending rate based on the received return probe packets is specifically:

sending, by the transmit end device, one data packet each time one return probe packet is received. In one embodiment, the determining, by the transmit end device, a data packet sending rate based on the received return probe packets is specifically: sending, by the transmit end device, n data packets each time one return probe packet is received, where n is a natural number. In a possible implementation, a quantity n of to-be-sent data packets corresponding to each return probe packet may be calculated according to a formula $$n = \left\lceil \frac{S_{credit}}{S_{data} \cdot r_{tar}} \right\rceil,$$

where $r_{tar}$ is a percentage of the reserved bandwidth of the egress port of the intermediate device in the network in a total bandwidth of the egress port, $S_{data}$ is an average packet length of the data packets in the network, $S_{credit}$ is a packet length of the return probe packet, $$\left\lceil \frac{S_{credit}}{S_{data} \cdot r_{tar}} \right\rceil$$

indicates that $$\frac{S_{credit}}{S_{data} \cdot r_{tar}}$$

is rounded up, and the packet length of the return probe packet is the same as a packet length of the forward probe packet.

In one embodiment, a buffer is configured on the intermediate device in the network to deal with a burst of probe packets. In this way, in a specific implementation, when the forward probe packets occupy all of the buffer, a forward probe packet whose sending rate exceeds the reserved bandwidth may be discarded.

According to still another aspect, a network congestion control method is provided. The method includes:

sending, by a transmit end device, forward probe packets at a preset initialized rate; discarding, by an intermediate device in a network based on a reserved bandwidth of an egress port of the intermediate device, a forward probe packet whose sending rate exceeds the reserved bandwidth, and forwarding the forward probe packets; receiving, by a destination device, the forward probe packets forwarded by the intermediate device; determining, by the destination device by using a preset period as a time unit, a packet loss rate of forward probe packets in the period based on received forward probe packets; determining, by the destination device, a data packet sending rate in a next period based on the packet loss rate of the forward probe packets, and notifying the transmit end device of the data packet sending rate; and sending, by the transmit end device, a data packet at the sending rate in the next period.

In one embodiment, during initial data transmission, the transmit end device does not need to wait for a returned probe packet, and may directly transmit the data packets at a relatively low rate while transmitting the probe packets the first time. In this way, a one-RTT handshake latency is reduced in the first-round data transmission, and small flow transmission performance is improved in a scenario such as a WAN network.

In one embodiment, the transmit end periodically adjusts a sending rate of the forward probe packets based on a packet loss rate of forward probe packets, and the periodically adjusting the sending rate of the forward probe packets may be implemented as follows:

comparing the packet loss rate of the forward probe packets with a target packet loss rate in a current period; and performing different rate adjustment on the sending rate of the forward probe packets based on a comparing result.

If the packet loss rate of the forward probe packets is less than the target packet loss rate, a sending rate of forward probe packets in a next period is increased. In one embodiment, when the sending rate of the forward probe packets in the next period needs to be increased, the sending rate of the probe packets in the next period is calculated according to a formula: next_rate=cur_rate×[1+(tar_loss−cur_loss)×(max_rate−cur_rate)/cur_rate]. In another implementation solution, there may be another rate increase method, for example, the rate is increased according to a fixed percentage.

If the packet loss rate of the forward probe packets is higher than the target packet loss rate, the sending rate of the forward probe packets in the next period is decreased. In one embodiment, when the sending rate of the probe packets in the next period needs to be decreased, the sending rate of the probe packets is calculated according to a formula: next_rate=cur_rate×[1×(cur_loss−tar_loss)×max_rate/(max_rate−cur_rate)], where cur_rate is a probe packet sending rate in the current period, next_rate is a preset probe packet sending rate in the next period, tar_loss is the target packet loss rate of the probe packets, cur_loss is the packet loss rate of the probe packets in the current period, and max_rate is a maximum sending rate allowed in the network. In another implementation solution, there may be another rate decrease method, for example, the rate is decreased according to a fixed percentage.

According to still another aspect, a network congestion control device is provided, where the device includes:

a probe packet sending module, configured to send forward probe packets to a destination device at a preset initialized rate, where some or all of the forward probe packets arrive at the destination device after being rate-limited forwarded by an intermediate device in a network by using a reserved bandwidth of an egress port of the intermediate device; a receiving module, configured to receive return probe packets returned by the destination device, where the return probe packets correspond to forward probe packets received by the destination device; a rate determining module, configured to determine a data packet sending rate based on return probe packets received by the receiving module; and a data packet sending module, configured to send a data packet at the sending rate.

In one embodiment, the rate determining module is specifically configured to:

enable the data packet sending module to send one data packet each time one return probe packet is received.

In one embodiment, the rate determining module includes:

a quantity calculation unit, configured to calculate, based on an average packet length of data packets in the network, a packet length of a probe packet, and a percentage of the reserved bandwidth of the egress port of the intermediate device in the network in a total bandwidth of the egress port of the intermediate device, a quantity n of to-be-sent data packets corresponding to each return probe packet, where n is a natural number, and a packet length of the return probe packet is the same as a packet length of the forward probe packet; and a rate determining unit, configured to enable the data packet sending module to send n data packets each time one return probe packet is received.

In one embodiment, the device further includes: a packet loss rate calculation module, configured to calculate, by using a preset period as a time unit, a packet loss rate of forward probe packets in the time unit based on a quantity of return probe packets received by the receiving module and a quantity of forward probe packets sent by the probe packet sending module.

In this case, the quantity calculation unit is configured to determine the data packet sending rate based on the packet loss rate obtained through calculation by the packet loss rate calculation module and the initialized rate.

In one embodiment, the device further includes: an adjustment module, configured to periodically adjust, by using a preset period as a time unit, a sending rate of the forward probe packets based on the packet loss rate obtained through calculation by the packet loss rate calculation module.

According to still another aspect, a network congestion control device is provided, where the device includes:

a rate initialization module, configured to initialize first-round sending rates of probe packets and data packets based on an application bandwidth requirement, where the first-round sending rate of the probe packets is higher than the application bandwidth requirement, and the first-round sending rate of the data packets is lower than the application bandwidth requirement; a sending module, configured to send the probe packets and the data packets to a destination device at the respective first-round sending rates; and an ending module, configured to: when probe packets returned by the destination device are received, end first-round sending of the data packets.

According to still another aspect, a network congestion control system is provided, and the system includes a transmit end device, an intermediate device, and a destination device;

the transmit end device is configured to send forward probe packets at a preset initialized rate; the intermediate device in the network is configured to discard, based on a reserved bandwidth of an egress port of the intermediate device, a forward probe packet whose sending rate exceeds the reserved bandwidth, and forward the forward probe packets; the destination device is configured to receive the forward probe packets forwarded by the intermediate device, and return probe packets to the transmit end device, where the return probe packets correspond to forward probe packets received by the destination device; and the transmit end device is further configured to receive the return probe packets, determine a data packet sending rate based on the received return probe packets, and send a data packet at the sending rate.

According to still another aspect, a network congestion control system is provided, and the system includes a transmit end device, an intermediate device, and a destination device;

the transmit end device is configured to send forward probe packets at a preset initialized rate; the intermediate device in the network is configured to discard, based on a reserved bandwidth of an egress port of the intermediate device, a forward probe packet whose sending rate exceeds the reserved bandwidth, and forward the forward probe packets; the destination device is configured to receive the forward probe packets forwarded by the intermediate device, and determine, by using a preset period as a time unit, a packet loss rate of forward probe packets in the period based on received forward probe packets; the destination device is further configured to determine a data packet sending rate in a next period based on the packet loss rate of the forward probe packets, and notify the transmit end device of the data packet sending rate; and the transmit end device is further configured to send a data packet at the sending rate in the next period.

According to still another aspect, a source host is provided, and the host includes:

a processor and a readable storage medium. The processor and the readable storage medium are coupled by using a bus, and the readable storage medium stores a program instruction. When executing the program instruction, the processor performs the following steps:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and determining a data packet sending rate based on the received return probe packets, and sending a data packet at the sending rate.

According to yet another aspect, a source host is provided, and the host includes:

a processor and a readable storage medium. The processor and the readable storage medium are coupled by using a bus, and the readable storage medium stores a program instruction. When executing the program instruction, the processor performs the following steps: initializing first-round sending rates of probe packets and data packets based on an application bandwidth requirement, where the first-round sending rate of the probe packets is higher than the first-round sending rate of the data packets; sending the probe packets and the data packets to a destination device at the respective first-round sending rates; and when probe packets returned by the destination device are received, ending first-round sending of the data packets.

According to yet another aspect, a source host is provided, and the host includes one or more device processors, memories, communications interfaces, receivers, transmitters, and input/output modules. When the processor may be configured to invoke an implementation program, of the network congestion method on a source device side, stored in the memory, the following steps are performed:

enabling the transmitter to send forward probe packets to a destination device at a preset initialized rate, where some or all of the forward probe packets arrive at the destination device after being forwarded by an egress port of an intermediate device in a network by using a reserved bandwidth of the egress port; enabling the receiver to receive return probe packets returned by the destination device, where the return probe packets correspond to probe packets received by the destination device; and determining, by the device processors, or enabling the communications interface to determining a data packet sending rate based on the received return probe packets, and enabling the transmitter to send a data packet at the sending rate.

According to yet another aspect, a source host is provided, and the host includes one or more device processors, memories, communications interfaces, receivers, transmitters, and input/output modules; and when the processor may be configured to invoke an implementation program, of the network congestion method on a source device side, stored in the memory, the following steps are performed:

initializing first-round sending rates of probe packets and data packets based on an application bandwidth requirement, where the first-round sending rate of the probe packets is higher than the first-round sending rate of the data packets; enabling the transmitter to send the probe packets and the data packets to a destination device at the respective first-round sending rates; and enabling the transmitter to end first-round sending of the data packets when probe packets returned by the destination device are received.

According to still another aspect, a network congestion control method is provided. The method includes:

sending, by a transmit end device, forward probe packets at a preset initialized rate; discarding, by an intermediate device in a network based on a reserved bandwidth of an egress port of the intermediate device, a forward probe packet whose sending rate exceeds the reserved bandwidth, and forwarding the forward probe packets; receiving, by a destination device, the forward probe packets forwarded by the intermediate device; returning, by the destination device, return probe packets to the transmit end device, where the return probe packets correspond to forward probe packets received by the destination device; receiving, by the transmit end device, the return probe packets; and sending, by the transmit end device, one data packet each time one return probe packet is received.

According to still another aspect, a network congestion control system is provided, and the system includes a transmit end device, an intermediate device, and a destination device;

the transmit end device is configured to send forward probe packets at a preset initialized rate; the intermediate device in the network is configured to discard, based on a reserved bandwidth of an egress port of the intermediate device, a forward probe packet whose sending rate exceeds the reserved bandwidth, and perform rate-limited forwarding on the forward probe packets; the destination device is configured to receive the forward probe packets forwarded by the intermediate device, and return probe packets to the transmit end device, where the return probe packets are forward probe packets received by the destination device; and the transmit end device is further configured to receive the return probe packets, and send one data packet each time one return probe packet is received.

According to still another aspect, a network congestion control method is provided. The method includes:

sending, by a transmit end device, forward probe packets at a preset initialized rate; discarding, by an intermediate device in a network based on a reserved bandwidth of an egress port of the intermediate device, a forward probe packet whose sending rate exceeds the reserved bandwidth, and forwarding the forward probe packets; receiving, by a destination device, the forward probe packets forwarded by the intermediate device; returning, by the destination device, return probe packets to the transmit end device, where the return probe packets correspond to forward probe packets received by the destination device; receiving, by the transmit end device, the return probe packets; and sending, by the transmit end device, n data packets each time one return probe packet is received, where n is a natural number.

According to yet another aspect, a source host is provided, and the host includes:

a processor and a readable storage medium. The processor and the readable storage medium are coupled by using a bus, and the readable storage medium stores a program instruction. When executing the program instruction, the processor performs the following steps:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and receiving the return probe packets, and sending one data packet each time one return probe packet is received.

According to yet another aspect, a source host is provided, and the host includes one or more device processors, memories, communications interfaces, receivers, transmitters, and input/output modules. When the processor may be configured to invoke an implementation program, of the network congestion method on a source device side, stored in the memory, the following steps are performed:

enabling the transmitter to send forward probe packets to a destination device at a preset initialized rate, where some or all of the forward probe packets arrive at the destination device after being forwarded by an egress port of an intermediate device in a network by using a reserved bandwidth of the egress port; enabling the receiver to receive return probe packets returned by the destination device, where the return probe packets correspond to probe packets received by the destination device; and enabling, by the device processors or by driving the communications interface, the transmitter to send one data packet each time one return probe packet is received.

According to yet another aspect, a source host is provided, and the host includes:

a processor and a readable storage medium. The processor and the readable storage medium are coupled by using a bus, and the readable storage medium stores a program instruction. When executing the program instruction, the processor performs the following steps:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and receiving the return probe packets, and sending n data packet each time one return probe packet is received, where n is a natural number.

According to yet another aspect, a source host is provided, and the host includes one or more device processors, memories, communications interfaces, receivers, transmitters, and input/output modules. When the processor may be configured to invoke an implementation program, of the network congestion method on a source device side, stored in the memory, the following steps are performed:

enabling the transmitter to send forward probe packets to a destination device at a preset initialized rate, where some or all of the forward probe packets arrive at the destination device after being forwarded by an egress port of an intermediate device in a network by using a reserved bandwidth of the egress port; enabling the receiver to receive return probe packets returned by the destination device, where the return probe packets correspond to probe packets received by the destination device; and enabling, by the device processors or by driving the communications interface, the transmitter to correspondingly send n data packet each time the receiver receives one return probe packet, where n is a natural number.

According to still another aspect, protocol stack software is provided, and program code of the protocol stack software may be stored in a readable storage medium. When a computer that is used as a source device reads the program code of the protocol stack software in the readable storage medium, the following steps are performed:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and receiving the return probe packets, and sending n data packet each time one return probe packet is received, where n is a natural number.

In one embodiment, a quantity n of to-be-sent data packets corresponding to each return probe packet may be calculated according to a formula $$n = \lceil \frac{S_{credit}}{S_{data} \cdot r_{tar}} \rceil,$$

where $r_{tar}$ is a percentage of the reserved bandwidth of the egress port of the intermediate device in the network in a total bandwidth of the egress port, $S_{data}$ is an average packet length of the data packets in the network, $S_{credit}$ is a packet length of the return probe packet, and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

According to still another aspect, a readable storage medium is provided, and the readable storage medium stores program code of a protocol stack software. When a computer that is used as a source device reads the program code of the protocol stack software in the readable storage medium, the following steps are performed:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and receiving the return probe packets, and sending one data packet each time one return probe packet is received.

According to still another aspect, a readable storage medium is provided, and the readable storage medium stores program code of a protocol stack software. When a computer that is used as a source device reads the program code of the protocol stack software in the readable storage medium, the following steps are performed:

sending forward probe packets to a destination device at a preset initialized rate, where some or all of the forward probe packets arrive at the destination device after being forwarded by an egress port of an intermediate device in a network by using a reserved bandwidth of the egress port; receiving return probe packets returned by the destination device, where the return probe packets correspond to probe packets received by the destination device; and determining a data packet sending rate based on the received return probe packets, and sending a data packet at the sending rate.

Compared with a data center network scenario in the prior art, in a probe packet transmission method in forward and return paths in the solution in the embodiments of the present disclosure, a "foresight" congestion control solution that is based on probe packet rehearsal transmission can be applicable to a WAN network with more obvious asymmetry, and becomes a general congestion control method.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some of the embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following further describes the embodiments of the present disclosure in detail with reference to the accompanying drawings.

Figure 1:
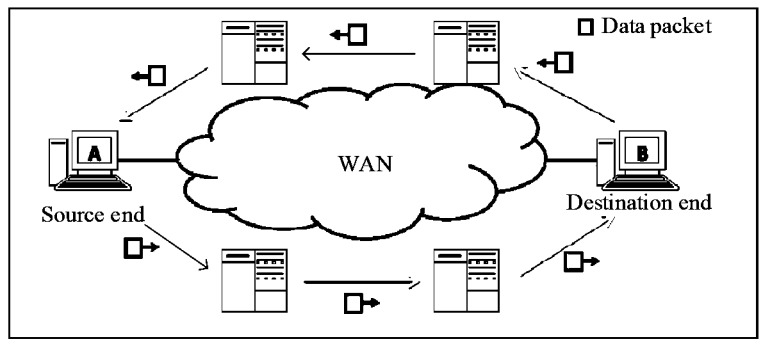
FIG. 1 is a schematic diagram of an application scenario in a WAN network according to an embodiment.

In a congestion control policy provided in the embodiments of the present disclosure, a general lossless low-latency end-to-end congestion control method is designed for a WAN (wide area network) network scenario. As shown in FIG. 1, an application scenario corresponding to the embodiments of the present disclosure is a data transmission scenario in a more general WAN (wide area network) network. According to FIG. 1, a forward path and a return path of a data packet are two different paths. In a general WAN network scenario, not all switches/routers are controllable. Therefore, in the WAN network, consistency between a forward path and a return path cannot be implemented by adjusting a deterministic hash on the switch/router. Therefore, a forward data transmission path is relatively commonly inconsistent with a return data transmission path between a source end and a destination end.

Figure 2:
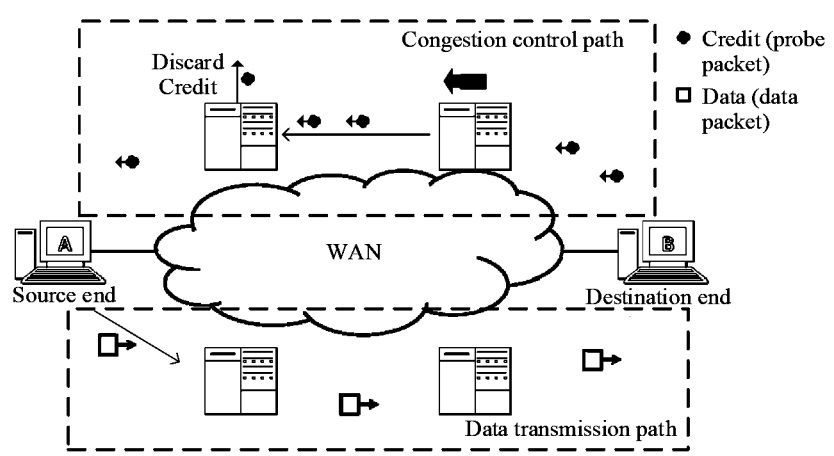
FIG. 2 is a schematic diagram of an application scenario in a WAN network according to an embodiment.

If a "foresight" lossless congestion control method for a data center network is extended to the more general WAN scenario, the following technical problems need to be resolved:

1. Asymmetric Routing Problem:

Different from a data center network (DCN) scenario, in the more general WAN network scenario, not all switches/routers are controllable, and therefore consistency between a forward path and a return path cannot be implemented by using deterministic ECMP supported by a device in an existing solution. As shown in FIG. 2, if an existing policy is directly migrated to the WAN network scenario, a transmission path of a return credit (a probe packet) data packet is inconsistent with a transmission path of a forward data packet, and a problem of "adjusting a forward packet sending rate based on a return path status" occurs.

Figure 3:
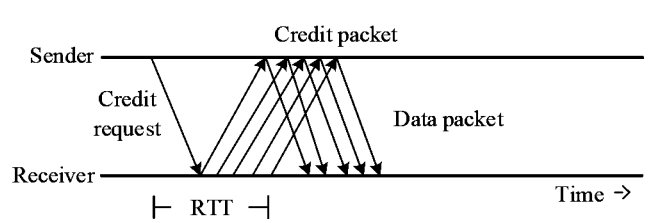
FIG. 3 is a schematic diagram of a one-RTT handshake latency introduced in probe packet transmission establishment in the prior art.

2. A Problem of an Extremely Long Handshake Time of a Probe Packet:

To implement lossless congestion control, a probe packet (for example, a credit (a probe packet) packet in an ExpressPass policy) needs to be transmitted in advance to perceive a network status, and a formal data packet is transmitted based on a probe result. The method in the prior art is directly applied, a one-RTT handshake latency is introduced before the probe packet is transmitted, to establish a transmission relationship, as shown in FIG. 3. In the data center network scenario, one RTT is very short (a microsecond-level latency), and a transmission startup speed is not affected. However, in the WAN network scenario, one RTT is much longer (a millisecond-level latency), first-round transmission starts slowly, and this is not conducive to transmission of a small flow that is sensitive to a latency. If a handshake time of a probe packet in the WAN network is extremely long, performance of the small-flow transmission is affected.

Figure 4:
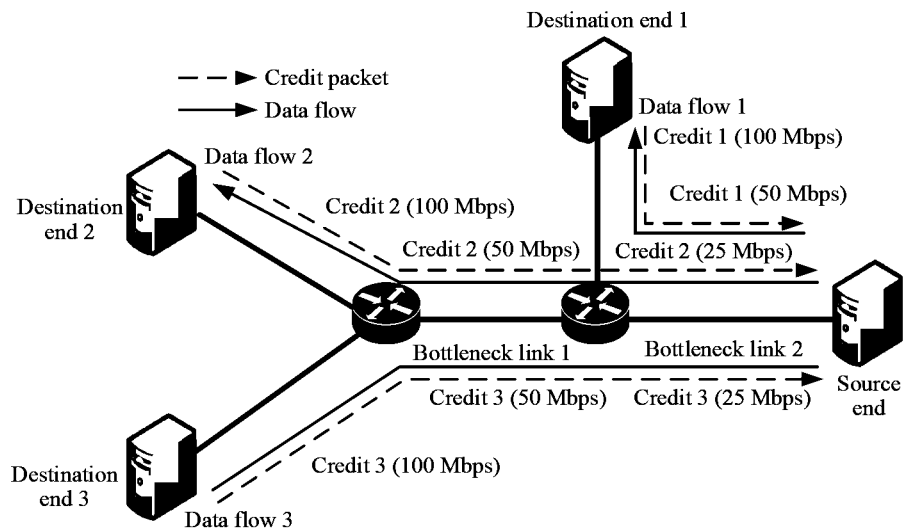
FIG. 4 is a schematic diagram of sending rate unfairness caused by a multi-hop bottleneck link topology according to an embodiment.

3. Fairness Problem:

Compared with the data center network in a symmetric topology structure, there are more diversified topology structures in the WAN network scenario, and a multi-hop link bottleneck likely affects transmission fairness. As shown in FIG. 4, a source end simultaneously transmits data flows of a same service to three destination ends, and a bandwidth of each link is assumed to be 100 Mbps. It is assumed that each destination end sends a credit packet (a probe packet) at a rate of 100 Mbps. After credit packets sent by destination ends 2 and 3 pass through a bottleneck link 1, rates of the credit packets are limited to 50 Mbps. After credit packets sent by destination ends 1, 2, and 3 pass through a bottleneck link 2, rates of credit packet flows are limited to 50 Mbps, 25 Mbps, and 25 Mbps respectively. Fair rate adjustment on a plurality of paths is not implemented. (In fair rate adjustment and control, all the rates of the credit packet flows on the three paths should be limited to 33 Mbps.)

It should be noted that, end side nodes described below in the embodiments, such as a destination node, a receive end node, a source node, and a transmit end node may be logically understood as a concept. During actual physical implementation, the source node (which may also be referred to as the transmit end node) may be an end side device, for example, a transmit end device such as a source device or a source host. During actual physical implementation, the receive end node may be an end side device, for example, a destination device, a receive end device, or a receive end host. For brevity, in some descriptions in the embodiments of the present disclosure, the destination node is also directly referred to as a destination end, and the source node is referred to as a source end. This is well understood by a person of ordinary skill in the art.

The end side devices and intermediate network devices in FIG. 1 need to collaborate to implement the congestion control policy disclosed in the embodiments of the present disclosure. The end nodes (e.g., the source end (namely, the transmit end device)/the destination end (e.g., the receive end device)) are mainly responsible for sending a probe packet, adjusting a probe packet rate, and adjusting a data packet sending rate based on the probe packet rate. The intermediate network devices (such as a router, a switch, or another switch device) are responsible for normally transmitting data packets and also reserving a link bandwidth for transmitting probe packets.

After the application scenario of the embodiments of the present disclosure and several key problems to be resolved in the embodiments of the present disclosure are described, the following describes a network congestion control method according to the embodiments of the present disclosure.

Figure 10:
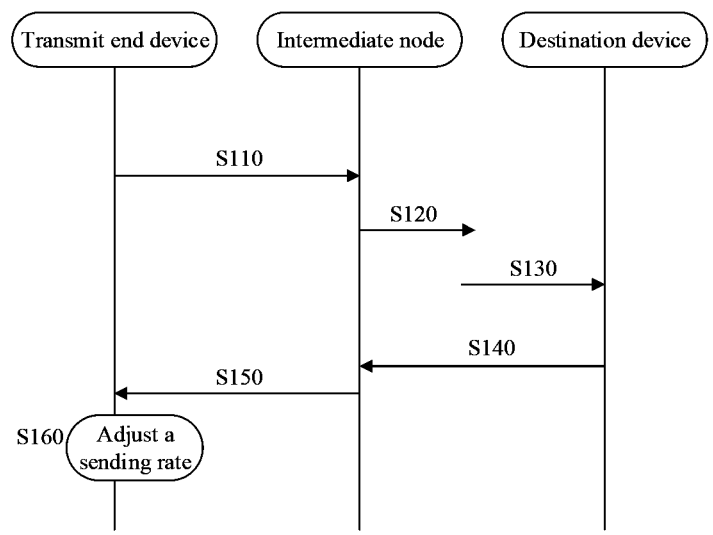
FIG. 10 is a flowchart of a network congestion control method according to an embodiment.

As shown in FIG. 10, an embodiment of the present disclosure discloses a network congestion control method, and the method includes the following steps.

S110. A transmit end device sends forward probe packets at a preset initialized rate.

S120. An intermediate device in a network discards, based on a reserved bandwidth of an egress port of the intermediate device, a forward probe packet whose sending rate exceeds the reserved bandwidth, and forwards the forward probe packets.

By performing this step, the forward probe packets are rate-limited forwarded.

S130. A destination device receives the forward probe packets forwarded by the intermediate device.

S140. The destination device returns return probe packets to the transmit end device, where the return probe packets correspond to forward probe packets received by the destination device.

In an embodiment, that the return probe packets correspond to the forward probe packets received by the destination device may be understood as follows:

When a probe packet is sent back, the destination device exchanges a source IP address and a destination IP address of the probe packet, and returns the probe packet to a source host. Therefore, the return probe packets correspond to the forward probe packets received by the destination device.

In an embodiment, for example, if ten forward probe packets are received, ten corresponding return probe packets are returned. A quantity of returned return probe packets is equal to a quantity of received forward probe packets.

In one embodiment, the intermediate device in the network forwards the return probe packets by using a regular bandwidth of the egress port of the intermediate device. The regular bandwidth is a bandwidth other than the reserved bandwidth, the regular bandwidth is greater than an application-layer bandwidth requirement, and the reserved bandwidth is less than the application-layer bandwidth requirement.

In one embodiment, a sending priority of the return probe packets may be further set to a highest priority.

S150. The transmit end device receives the return probe packets.

S160. The transmit end device determines a data packet sending rate based on the received return probe packets, and sends a data packet at the sending rate.

In one embodiment, S160 may be as follows: The transmit end device sends one data packet each time the transmit end device receives one return probe packet.

In one embodiment, S160 may be as follows: The transmit end device sends n data packets each time the transmit end device receives one return probe packet.

In one embodiment, a quantity n of to-be-sent data packets corresponding to each return probe packet may be calculated according to a formula $$n = \left\lceil \frac{S_{credit}}{S_{data} \cdot r_{tar}} \right\rceil,$$

where $r_{tar}$ is a percentage of the reserved bandwidth of the egress port of the intermediate device in the network in a total bandwidth of the egress port, $S_{data}$ is an average packet length of the data packets in the network, $S_{credit}$ is a packet length of a probe packet in the network (it should be noted herein that packet lengths of probe packets in the network are the same, and therefore, the packet length is a packet length of a forward probe packet or a packet length of a return probe packet), and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

It should be noted that, in general, data packets are encapsulated according to a maximum transmission unit (MTU) by default, for example, the data packets are encapsulated by using a maximum Ethernet frame 1538 B. In this way, the lengths of the data packets are the same, in other words, are known. However, if operators encapsulate packets by default, statistics can be collected only by the operators. In an embodiment, statistics about packet lengths of all data packets in the network may be collected, and then an average value is taken. In another embodiment, statistics about packet lengths of a preset quantity of data packets may also be collected by sampling, and an average value is taken as the average packet length of the data packets in the network.

In one embodiment, the probe packets are sent in a pacing mechanism. The pacing mechanism means that all data packets are sent at an equal packet interval. For example, if ten packets are sent per second, an interval between two packets is strictly 1 ms.

Certainly, it may be understood that in another embodiment, the probe packets and the data packets may alternatively be sent in another manner. For example, a control packet may also be sent still by using a conventional TCP window mechanism. Specifically, during each-round data sending, the transmit end simultaneously sends k packets at a minimum packet interval according to a window size k, and then enters a waiting state. After receiving a returned control packet, the transmit end adjusts the window size k based on a packet loss status, and sends a next-round control packet. Compared with the pacing mechanism, for example, when ten packets are sent per second, in the window mechanism, the packets are sent at minimum interval. In this case, the transmit end may send the ten packets within 3 ms, and is in the waiting state and send no packet in the remaining 7 ms.

In view of limitation of the data center scenario in the prior art, this embodiment implements lossless low-latency congestion control in a data transmission process in a more general WAN network scenario other than the data center network scenario. In this embodiment, a probe packet transmission method in forward and return paths is used, to resolve a path asymmetry problem in the WAN network scenario, and implement lossless congestion control in a more general scenario. In a "foresight" control method that is based on probe packet rehearsal transmission, fast convergence of a congestion control policy is ensured. A mechanism for adjusting a probe packet rate based on a current packet loss rate and a current sending rate is designed, to ensure fairness of a plurality of end-to-end data transmissions.

Figure 13:
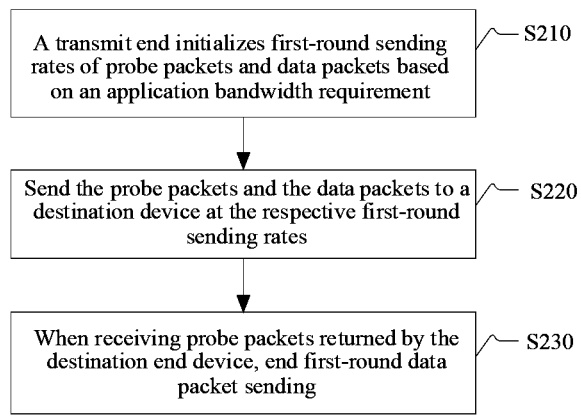
FIG. 13 is a flowchart of a first-round data packet sending method according to an embodiment.

As shown in FIG. 13, an embodiment of the present disclosure provides a first-round data packet sending method, and the method includes the following steps.

S210. A transmit end initializes first-round sending rates of probe packets and data packets based on an application bandwidth requirement, where the first-round sending rate of the probe packets is higher than the first-round sending rate of the data packets.

In one embodiment, usually, the probe packets are transmitted relatively radically in first-round transmission, and the packet sending rate is higher than the application bandwidth requirement, to fully use network resources. The data packets are transmitted relatively conservatively in the first-round transmission, and the packet sending rate is lower than the application bandwidth requirement, to avoid impact of an extremely long handshake latency on small flow transmission.

For example, in an embodiment, an interface at an application layer notifies a network layer of a requirement of the application layer, to be specific, a requirement of the application layer on a network bandwidth, for example, a bandwidth required for watching a video or a bandwidth required for transferring a file. For example, a high-definition video requires a 1 Gbps bandwidth. In this case, 1.5 Gbps can be selected as a first-round sending rate of GPS probe packets, and 0.6 GBPS is selected as the first-round sending rate of the data packets.

S220. Send the probe packets and the data packets to a destination device at the respective first-round sending rates.

S230. When receiving probe packets returned by the destination device, end first-round sending of the data packets.

In one embodiment, the probe packets are all sent in a pacing mechanism.

Certainly, it may be understood that in another possible implementation, the probe packets and the data packets may alternatively be sent in another mechanism, for example, a windows mechanism described in the above solution.

Figure 15:
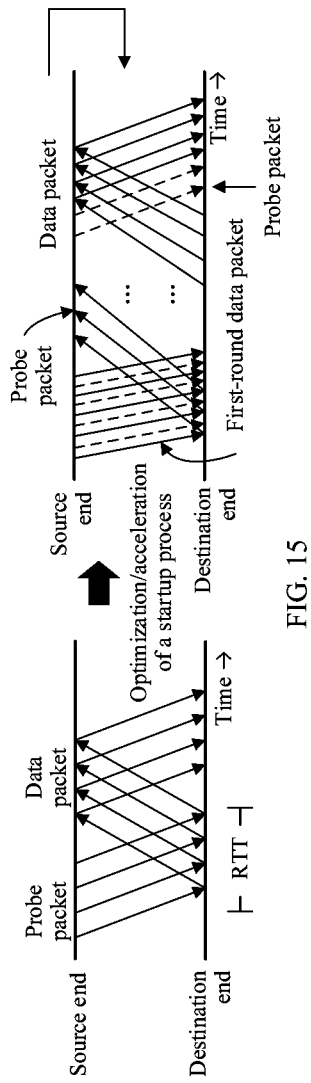
FIG. 15 is a schematic diagram of a first-round transmission mechanism according to an embodiment.

FIG. 15 vividly describes an effect of the solution in this embodiment. As shown in the left figure in FIG. 15, if a return probe packet is received, probe packets usually need be transmitted in advance to perceive a network status, and a formal data packet is transmitted based on a probe result. A one-RTT handshake latency is introduced to establish a transmission relationship. However, in the solution in this embodiment, during the first-round data transmission, the source end directly transmits a data packet at a relatively low rate without waiting for a returned probe packet. In this mechanism, the one-RTT handshake latency is reduced for the first-round data transmission. In a scenario such as a WAN network scenario, small flow transmission performance is improved, and a small flow transmission performance loss caused by a relatively long handshake latency is reduced in the WAN network scenario.

Further, this embodiment of the present disclosure is described in detail with reference to a specific actual network scenario.

Figure 5:
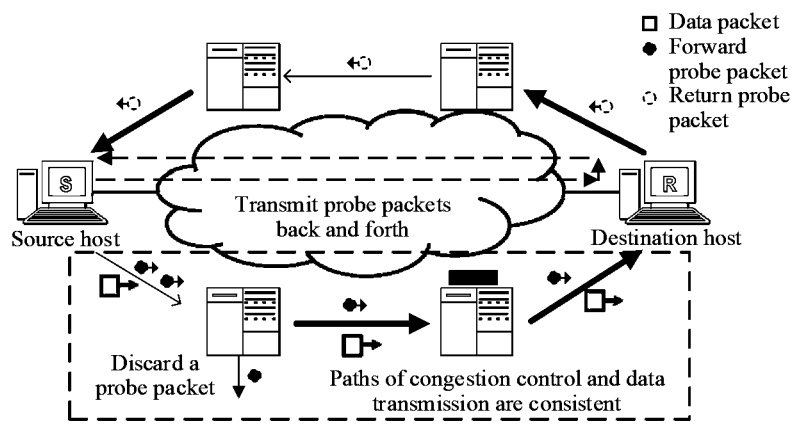
FIG. 5 is a schematic diagram of a scenario application overview according to an embodiment.

A main performing process of an end-to-end congestion method provided in this embodiment is summarized as shown in FIG. 5. In the congestion control method provided in this embodiment, a new probe method of transmitting probe packets on forward and return paths is designed, a packet loss rate is calculated based on the forward probe packets, and an asymmetric routing problem in a general scenario such as the WAN network is resolved. Further, policies of acceleration startup and probe packet rate adjustment are further proposed, and real-time performance and fairness of the congestion control policy are further ensured.

Figure 6A:
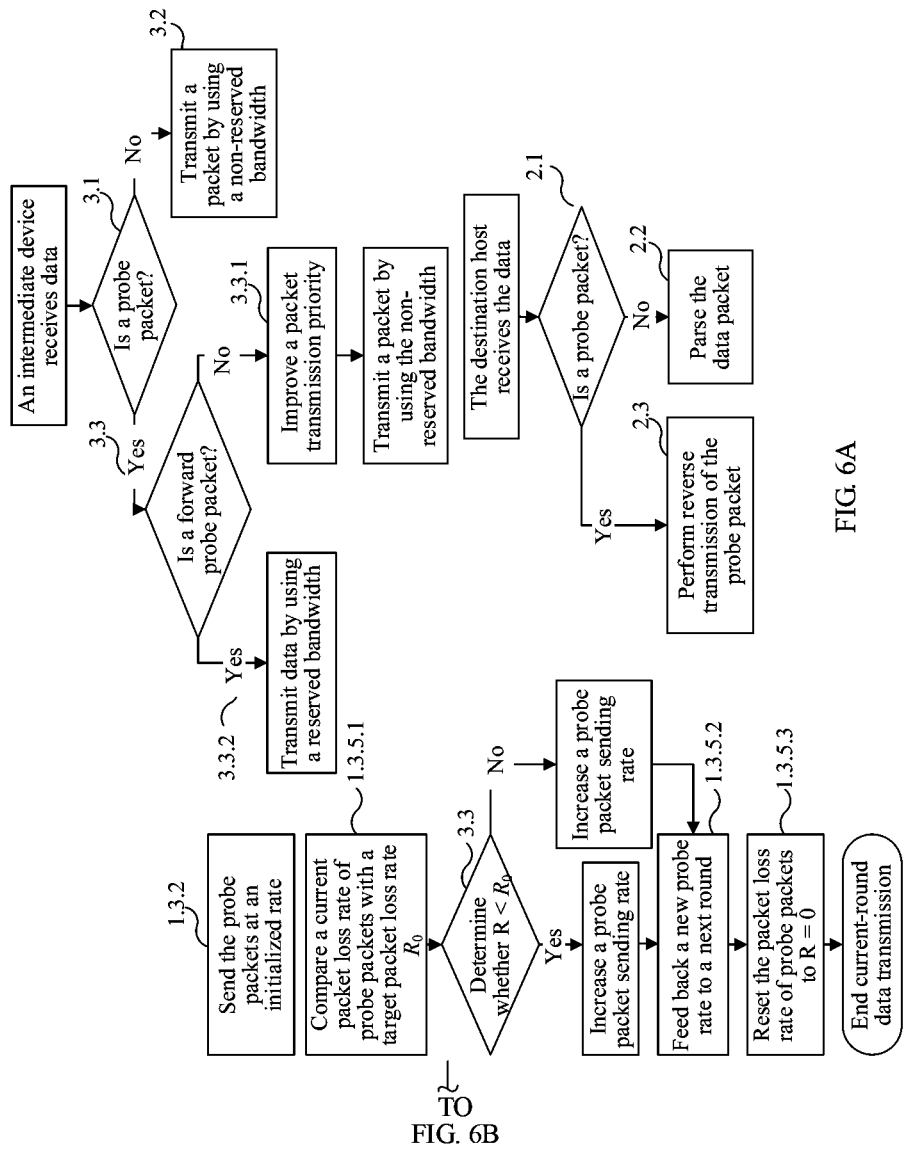
FIG. 6A and FIG. 6B are a schematic flowchart according to an embodiment.
Figure 6B:
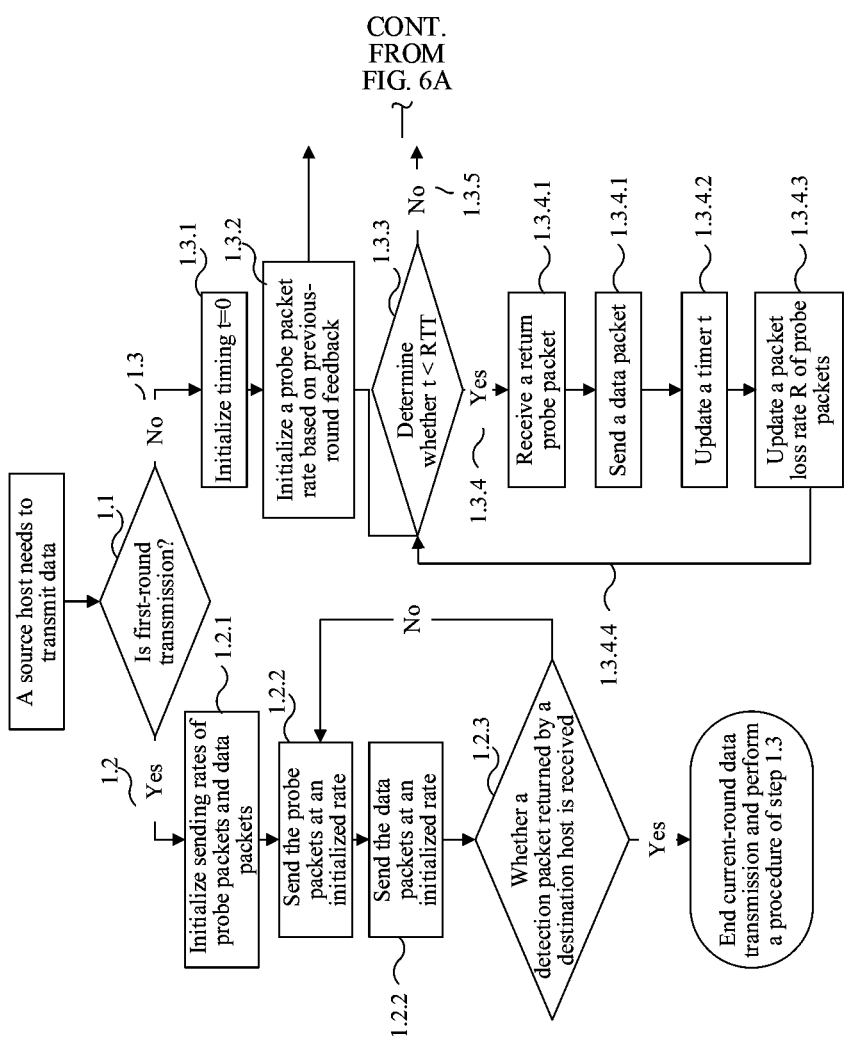

More specifically, in a congestion control process, working processes of a source host (e.g., the transmit end device), a destination host (e.g., the receive end device), and an intermediate network device (e.g., a switch/router) are summarized as shown in FIG. 6A and FIG. 6B.

As shown in FIG. 6A and FIG. 6B, when the source host needs to transmit data, the source host first determines whether current data transmission is the first-round transmission. If the current data transmission is the first-round transmission, the source host enters an acceleration startup phase of the congestion control method, and initializes a probe packet sending rate (which may be higher than a rate required by an application bandwidth in an embodiment) and a data packet sending rate (in an embodiment, the rate may be a relatively conservative sending rate, for example, is lower than the rate required by the application bandwidth). The probe packets (e.g., the forward probe packets) and the data packets are continuously sent at the initialized rates in the pacing mechanism until the probe packets (e.g., the return probe packets) returned by the destination host are received. When the source host receives the returned probe packets, the first-round data transmission ends and the acceleration startup phase also ends.

After the first-round data transmission, in a subsequent data transmission process, the data packet sending rate of the source host is adjusted and controlled by using the probe packets, and the probe packet sending rate is adjusted and controlled based on a packet loss rate of probe packets at an RTT interval. The specific congestion control process is as follows:

A timer is initialized to zero. Each time one probe packet is received, the source host sends one data packet, and also updates a timer time t and a packet loss rate R of the probe packets.

Then, the source host compares a current time with an RTT. If the timer time t does not reach one-RTT duration, the source host continues to cyclically perform operations of "receiving probe packets-sending data packets-updating the timer-updating the packet loss rate of the probe packets".

If the timer time t reaches the one-RTT duration, the source host compares a current-round packet loss rate R of probe packets with a target packet loss rate $R_0$. If $R > R_0$, the source host decreases a next-round packet sending rate of probe packets. If $R < R_0$, the source host increases the next-round packet sending rate of probe packets.

Last, the packet loss rate of probe packets is reset and the current-round (one RTT period) data transmission is ended.

In one embodiment, one RTT period is used as a regulation period, and in another embodiment, the regulation period may be greater than one RTT period, for example, two RTT periods or three RTT periods.

After receiving a packet from the source host, the destination host parses the packet and performs determining:

if it is determined that the packet is a probe packet, source and destination addresses of the packet are exchanged, and the probe packet is returned to the source host; and if it is determined that the packet is a data packet, normal parsing is performed.

The intermediate network device reserves partial link bandwidth (that is, a bandwidth reserved on an egress port) to exclusively transmit the forward probe packets. After receiving sent data, the intermediate device parses the data and performs determining: if it is determined that the data packet is a forward probe packet, the packet is transmitted by using the reserved link bandwidth; and in other cases, the packet is transmitted by using a non-reserved link bandwidth. To ensure that the return probe packets can be successfully returned to the source host, the intermediate device additionally improves a transmission priority of the return probe packets.

In general, according to the congestion control method in this embodiment of the present disclosure, the probe packets are sent in advance to perceive a network status and guide sending of the data packets, thereby implementing "foresight" lossless congestion control. Transmission of each pair of end-to-end probe packets is adjusted and converged to a same packet loss rate, thereby implementing fairness of transmission on all end-to-end paths. An acceleration startup mechanism is introduced in the first-round transmission of the source host, to avoid a small flow performance loss caused by a relatively long handshake latency in the WAN network scenario.

Further, implementations of different embodiments are further described in detail in the following several embodiments.

In the technical solution in this embodiment, the working processes of the source host, the destination host, and the intermediate network device comply with core working processes shown in FIG. 6A and FIG. 6B, and are customized on initialization of some parameters.

(1) In packet isolated transmission, to isolate transmission of the probe packets from transmission of the data packets, the following solutions may be used:

1. In a bandwidth reservation solution, the intermediate device reserves a percentage of bandwidth to transmit the probe packets, and the remaining bandwidth is used to transmit the data packets.

2. The probe packets are transmitted through constructing an independent signaling network.

In one embodiment, the probe packets are transmitted by using a reserved bandwidth. Specifically, a minimum Ethernet frame 84B is used to construct a probe packet, and the source end is driven to transmit a data packet by using a maximum Ethernet frame 1538 B. Therefore, a percentage of the bandwidth reserved for transmitting the probe packets in a total bandwidth is $84/(84+1538) \approx 5\%$.

It may be understood that sizes of specific Ethernet frames are merely examples, and should not be understood as limitations on this embodiment of the present disclosure. In another embodiment, a probe packet may be constructed and a data packet may be transmitted by using an Ethernet frame of another size.

Certainly, in another embodiment, the percentage of the bandwidth reserved for transmitting the probe packets in the total bandwidth may also be another value greater than 5%, for example, 8%, 10%, or 15%.

(2) In sending rate initialization, usually, the probe packets are transmitted relatively radically in the first-round transmission, and the packet sending rate is higher than the application bandwidth requirement, to fully use network resources. The data packets are transmitted relatively conservatively in the first-round transmission, and the packet sending rate is lower than the application bandwidth requirement, to avoid impact of an extremely long handshake latency on small flow transmission.

In this embodiment, the probe packet sending rate is initialized to 1.5 times of the application bandwidth requirement, and the first-round sending rate of the data packets is initialized to 30% of the application bandwidth requirement.

Certainly, in another embodiment, the probe packet sending rate may alternatively be another value, for example, twice the application bandwidth requirement, and the first-round sending rate of the data packets may also be another value, for example, 40% of the application bandwidth requirement.

(3) In probe packet rate adjustment, the target packet loss rate and a convergence algorithm of the probe packets need to be customized.

In setting of the target packet loss rate, the packet loss rate of the probe packets should be greater than 0, to fully probe and use link capacity of the network. In addition, the packet loss rate should not be too high to cause unnecessary waste and fairness problems. In this embodiment, the target packet loss rate of the probe packets is set to 10%.

Certainly, in another embodiment, the target packet loss rate may be not limited to the values, for example, may be set to 5%, 8%, 15%, or the like.

In design of the convergence algorithm, in this embodiment of the present disclosure, a next-round probe packet sending rate is adjusted based on a current packet loss rate and a current sending rate of the probe packets, to ensure that transmission of all end-to-end probe packets converges to a same packet loss rate, and implement transmission fairness. A general convergence method is that when the current packet loss rate is lower than the target packet loss rate, the rate is increased, and when the current packet loss rate is higher than the target packet loss rate, the rate is decreased. Specifically, the convergence algorithm in this embodiment is designed as follows:

Parameters are Defined as Follows:

cur_rate: a current-round probe packet sending rate;

next_rate: a next-round preset probe packet sending rate;

tar_loss: a target packet loss rate of probe packets;

tar_loss: a current-round packet loss rate of probe packets; and max_rate: a maximum sending rate allowed in a physical network. In an embodiment, the maximum sending rate allowed in the physical network is equal to an egress port bandwidth of a bottleneck intermediate device in the network, in other words, equal to an egress port bandwidth of an intermediate device with a smallest egress port bandwidth among all intermediate devices.

Certainly, in another embodiment, a network operator may alternatively set the maximum sending rate allowed in the physical network.

Convergence Algorithms are as Follows:

If the current-round (one RTT is used as a period) packet loss rate of the probe packets is lower than the target packet loss rate, the next-round packet sending rate of the probe packets is increased, and a specific rate increase algorithm is as follows:

next_rate=cur_rate×[1+(tar_loss−cur_loss)× (max_rate−cur_rate)/cur_rate].

If the current-round (one RTT is used as a period) packet loss rate of the probe packets is higher than the target packet loss rate, the next-round packet sending rate of the probe packets is decreased, and a specific rate increase algorithm is as follows:

next_rate=cur_rate×[1−(cur_loss−tar_loss)×max_rate/ (max_rate−cur_rate)].

With reference to the foregoing specific customization, the technical solution of this embodiment is summarized as the following three main steps, and are described as follows with reference to FIG. 6 A and FIG. 6B:

Step 1: Control rates of probe packets and data packets. This step is performed by a source host from a moment at which data transmission starts to a moment at which the data transmission completes. The specific operation process is as follows:

1.1 Determine whether current-round data transmission is first-round transmission, and perform different branch steps based on a determining result.

If the current-round transmission is the first-round data transmission, step 1.2 is performed.

If the current-round transmission is not the first-round data transmission, step 1.3 is performed.

1.2 In the first-round transmission, probe packet rate initialization and quickly starting of data packet transmission are mainly completed. The specific operations are as follows:

1.2.1 Initialize first-round sending rates of the probe packets and the data packets.

Specifically, in this embodiment, the first-round sending rates are respectively 1.5 times and 30% of an application bandwidth requirement.

1.2.2 Send the probe packets and the data packets at the respective initialized rates.

1.2.3 The source host determines whether the source host receives probe packets returned by a destination host, and performs different branch steps based on a determining result:

If the probe packets returned by the destination host are received, the first-round transmission ends, and step 1.3 is performed.

If the probe packets returned by the destination host are not received, step 1.2.3 is performed and the first-round data transmission continues.

1.3 After the first-round transmission, adjust sending rates of the probe packets and the data packets. A data packet sending rate is adjusted based on a probe packet returning rate. A probe packet sending rate is adjusted, to ensure that the probe packets are converged to a target packet loss rate (which is set to 10% in this embodiment, and may alternatively be set to other values in other embodiments, such as 5% or 8%). In this embodiment, the packet sending rate of the probe packets is adjusted by using one RTT as a period. The specific operations are as follows:

1.3.1 Initialize a timer t=0, and initialize a current-round probe packet sending rate based on previous-round feedback.

1.3.2 Transmit probe packets at a current-round initialized rate (in this embodiment, the current-round initialized rate is 1.5 times the application bandwidth requirement in step 1.2.1).

1.3.3 Determine whether current duration of the timer reaches an RTT length, and perform different branch steps based on a determining result.

If the duration of the timer reaches the RTT length, step 1.3.5 is performed to adjust the probe packet rate.

If the duration of the timer does not reach the RTT length, step 1.3.4 is performed to adjust the data packet rate.

1.3.4 Adjust the data packet rate based on the rate of the returned probe packets. The specific operations are as follows:

1.3.4.1 After receiving one returned probe packet, the source host immediately sends one data packet.

1.3.4.2 The source host records an interval Δt between a moment at which a current probe packet is received and a moment at which a previous probe packet is received, and updates the timer as t=t+Δt.

1.3.4.3 A packet loss rate R of the probe packets is updated based on sequence numbers of the probe packets.

For example, the packet loss rate is calculated as follows: It is assumed that there are ten probe packets in total, and sequence numbers are sequentially marked by using Arabic numerals. If the source end receives only probe packets with sequence numbers 1, 5, 6, 7, 8, 9, and 10, probe packets with sequence numbers 2, 3, and 4 are lost, and the packet loss rate R is 3/10=30%.

1.3.4.4 Return to step 1.3.3 and determine again whether the timer duration reaches the RTT length.

1.3.5 Adjust the probe packet rate mainly based on a current-round packet loss rate, a sending rate, and the target packet loss rate. The specific operations are as follows:

1.3.5.1 Compare the current-round packet loss rate with the target packet loss rate (10%), and then perform different adjustment operations on the rate based on a comparing result.

If the current-round packet loss rate is lower than the target packet loss rate, the next-round sending rate of the probe packets is increased by using the following method:

$$next\_rate=cur\_rate \times [1+(tar\_loss-cur\_loss) \times (max\_rate-cur\_rate)/cur\_rate].$$

Certainly, this is merely a rate increase method in this embodiment of the present disclosure. In another embodiment, there may be another rate increase method, for example, the rate is increased by a fixed percentage, for example, increased by 5%.

If the current-round packet loss rate is higher than the target packet loss rate, the next-round sending rate of the probe packets is decreased by using the following method:

$$next\_rate=cur\_rate \times [1-(cur\_loss-tar\_loss) \times max\_rate/(max\_rate-cur\_rate)].$$

Certainly, this is merely a rate increase method in this embodiment of the present disclosure. In another embodiment, there may be another rate decrease method, for example, the rate is decreased by a fixed percentage, for example, decreased by 5%.

1.3.5.2 Initialize the next-round sending rate of the probe packets by using an adjusted probe packet rate. In other words, the adjusted probe packet sending rate is used as the next-round sending rate of the probe packets.

1.3.5.3 Reset the packet loss rate of the probe packets to R=0.

Step 1.3 is still performed after the first-round transmission ends, until an entire end-to-end data transmission process ends. The probe packet rehearsal transmission is performed, a sending rate of the data packets can ensure that a network bandwidth is fully used and no packet loss occurs. Packet loss rates of the probe packets are converged to a same value, to ensure fairness of a plurality of end-to-end transmission.

For example, in an application scenario shown in FIG. 4, as shown in Table 1, after the sixth RTT period, by using the technical solution in this embodiment of the present disclosure, the packet loss rates of the probe packets are converged to approximately same values.

TABLE 1

Sending rates (unit: Gbps) of data flows at different moments in a network topology shown in FIG. 7

|        | RTT1 | RTT2 | RTT3 | RTT4 | RTT5 | RTT6 |
|--------|------|------|------|------|------|------|
| Flow 0 | 60   | 40   | 46   | 40   | 43   | 38   |
| Flow 1 | 35   | 28   | 35   | 32   | 35   | 33   |
| Flow 2 | 35   | 28   | 35   | 32   | 35   | 33   |

Step 2: Data processing of the destination host. This step is performed by the destination host. This step is performed each time one probe packet or data packet is received. The specific operation process is as follows:

2.1 After receiving data, the destination host first parses the data to determine whether the data is a probe packet or a data packet.

If the received packet is a data packet, step 2.2 is performed to parse the data packet.

If the received packet is a probe packet, step 2.3 is performed to return a probe packet.

2.2 Process the data packet: decapsulate and process the data packet in a working mode of a conventional transport layer protocol.

2.3 Return the probe packet: exchange a source IP address and a destination IP address of the probe packet, and return the probe packet to the source host.

Each time the destination host receives a transmitted forward network packet (a probe packet or a data packet), a process of steps 2.1 to 2.3 is performed to parse the data packet, and return the probe packet.

Step 3: An intermediate network device manages the probe packets and the data packets. This step is performed by the intermediate network device and lasts during the entire end-to-end transmission process. The specific operation process is as follows:

The intermediate network device reserves a specific percent of a bandwidth (which is 5% in this embodiment, and may alternatively be another value in another embodiment) for each link, to exclusively transmitting the probe packets.

3.1 After receiving a network packet from a previous-hop device, each intermediate device first determines whether the received packet is a data packet or a probe packet.

If the received packet is a data packet, step 3.2 is performed to transmit the data packet.

If the received packet is a probe packet, step 3.3 is performed to transmit and manage the probe packet.

3.2 Transmit the data packet: transmit the data packet by using a link bandwidth other than the reserved bandwidth.

3.3 Transmit and manage the probe packet: transmit and manage a forward probe packet and a return probe packet by using different methods. The specific operations are as follows:

3.3.1 Determine whether the probe packet is a forward packet or a return packet, and perform different branch steps based on a determining result.

If the probe packet is a forward packet, step 3.3.2 is performed to transmit and manage the forward packet.

If the probe packet is a return packet, step 3.3.3 is performed to transmit and manage the return packet.

3.3.2 Main steps for transmitting and managing the forward probe packet are as follows:

3.3.2.1 Transmit the forward probe packet by using the reserved bandwidth.

3.3.2.2 A small amount of buffer (which is eight probe packets in this embodiment, and may alternatively be another value in another embodiment) is reserved to cope with burst transmission of the probe packets.

3.3.2.3 When the probe packet buffer is all occupied, discard excess probe packets.

3.3.3 Main steps for transmitting and managing the return probe packet are as follows:

3.3.3.1 Increase a transmission priority of the returned probe packet.

3.3.3.2 Transmit the return probe packet by using a bandwidth other than the reserved bandwidth.

In the three main steps of the technical solution disclosed in this embodiment, in step 2 and step 3, it is equivalent that the probe packets are used as "substitutes" of the data packets, and a data transmission procedure is rehearsed in a current network environment. An accurate network load status is reported by using a probe packet loss of the intermediate device and probe packet returning of the source host. In step 1, the source host accurately controls the data packet sending rate based on the network status reflected by the probe packets, thereby implementing fast convergence and lossless in the entire congestion control process. In the entire congestion control process, the end-to-end devices (the source host, the destination host, and the intermediate network device) collaborate.

It should be noted that, in the foregoing 1:1 scenario, only the forward probe packets are sent through pacing, and sending the return probe packets and the data packets is triggered by using the probe packets. A packet loss may occur in middle of the network. Therefore, it cannot be ensured that the return probe packets and the data packets are sent through pacing, and the return probe packets and the data packets are sent at an interval at which the packets are received.

In view of limitation of the data center scenario in the prior art, this embodiment implements lossless low-latency congestion control in a data transmission process in a more general WAN network scenario other than the data center network scenario. In this embodiment, according to a method for transmitting probe packets in forward and return paths, a path asymmetry problem in the WAN network scenario is resolved, and lossless congestion control in a more general scenario is implemented. In the "foresight" control method that is based on probe packet rehearsal transmission, fast convergence of the congestion control policy is ensured. A mechanism for adjusting a probe packet rate based on a current packet loss rate and a current sending rate is designed, to ensure fairness of a plurality of end-to-end data transmissions.

Figure 7:
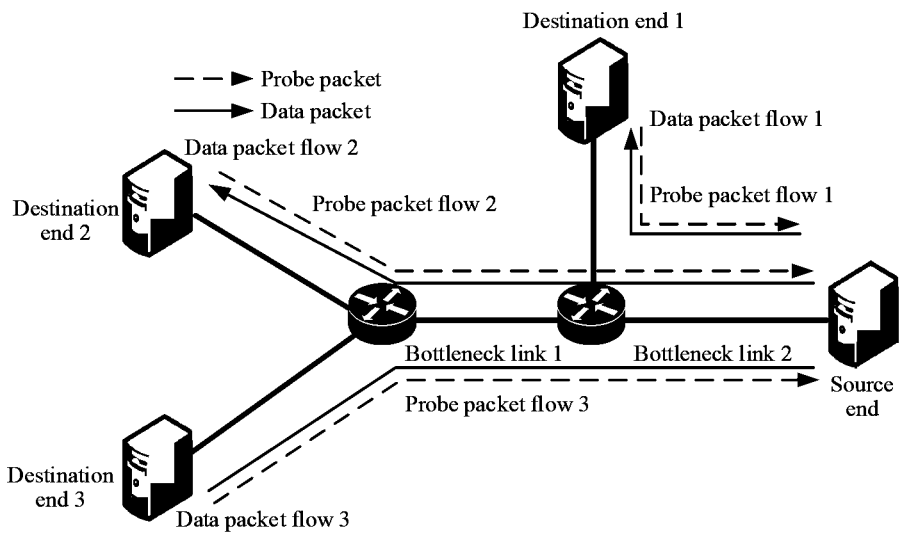
FIG. 7 is a schematic diagram of a simulation network environment according to an embodiment.

To further describe the technical effects of this embodiment of the present disclosure, a network topology structure similar to that of multi-hop bottleneck links in FIG. 7 is constructed in this embodiment of the present disclosure, and verification on lossless, convergence, and fairness of the solutions of the present disclosure is performed by using a data transmission effect in the network architecture. A network topology architecture of a specific simulation environment is shown in FIG. 7. One source host transmits data to three destination hosts at the same time, and a bandwidth of each link is 100 Gbps.

Figure 8:
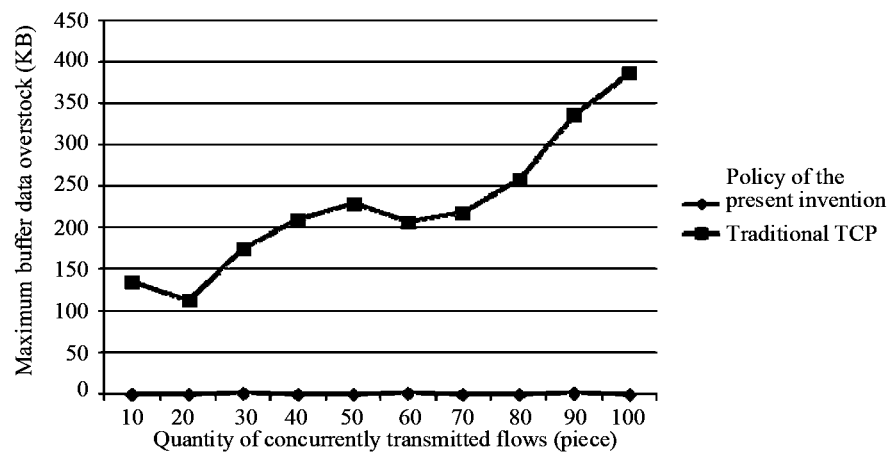
FIG. 8 is a schematic diagram of comparing of data overstock statuses according to an embodiment.

First, verification on a lossless guarantee of the congestion control policy in this embodiment of the present disclosure is performed. FIG. 8 shows changes of maximum buffer (buffer) overstocks of the intermediate network device as a quantity of concurrently transmitted data flows increases when the policy in the present disclosure and a conventional TCP policy are used. It can be learned that when the conventional TCP policy is used for congestion control, the buffer overstock of the intermediate device significantly increases as the quantity of concurrent transmission flows increases. Data queuing in the buffer further affects an end-to-end transmission latency and even causes congestion and a packet loss. However, by using the technical solutions in this embodiment of the present disclosure, data overstocks of the intermediate network device remain zero, and no matter how many data flows are concurrently transmitted, lossless end-to-end data transmission is ensured in the solutions in this embodiment of the present disclosure.

Figure 9:
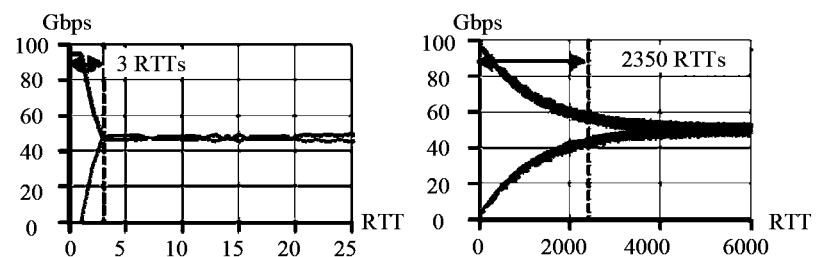
FIG. 9 is a schematic diagram of comparing of transmission convergence rates according to an embodiment of the present disclosure.

Then, verification on the convergence of the congestion control solution in this embodiment of the present disclosure is further performed. During convergence verification, a scenario is simulated in which a new data flow is unexpectedly introduced into a shared link when a data flow is in a stable transmission state. Time for converging data transmission to a stable rate (a rate of 50 Gbps for each flow) respectively used in the congestion control solution in this embodiment of the present disclosure and the conventional TCP is compared. A specific experiment result is shown in FIG. 9. It can be seen that, in the congestion control policy in this embodiment of the present disclosure, sending rates of two flows are converged to a stable rate (50 Gbps) within three RTT lengths. However, the convergence speed in the traditional TCP is slower by a plurality of orders of magnitude. The main reason is that, through the rehearsal transmission of the probe packets that are used as "substitutes", an actual network status is accurately mastered in the "foresight" congestion control policy in the present disclosure, and the sending rate can be directly adjusted to a most proper rate. However, in the conventional TCP protocol, end sides need to continuously attempt to detect the network status due to lack of the intermediate device. As a result, the rate fluctuates in a plurality of periods, and the convergence is relatively poor.

Finally, verification on a fairness guarantee of the solutions in this embodiment of the present disclosure is performed. Table 1 is extracted as follows again. Table 1 shows a change of a data sending rate on each pair of end-to-end paths with time in the congestion control mechanism disclosed in this embodiment of the present disclosure in the network topology shown in FIG. 7.

TABLE 1

Sending rates (unit: Gbps) of data flows at different moments in the network topology shown in FIG. 7

|  | RTT1 | RTT2 | RTT3 | RTT4 | RTT5 | RTT6 |
| --- | --- | --- | --- | --- | --- | --- |
| Flow 0 | 60 | 40 | 46 | 40 | 43 | 38 |
| Flow 1 | 35 | 28 | 35 | 32 | 35 | 33 |
| Flow 2 | 35 | 28 | 35 | 32 | 35 | 33 |

It can be seen that, in the congestion control mechanism in this embodiment of the present disclosure, after a few rounds of RTT time lengths, sending rates of three flows have converged to relatively fair statuses (e.g., 38 Gbps, 33 Gbps, and 33 Gbps). In the probe packet rate adjustment mechanism in the technical solution of this embodiment, fairness of a plurality of end-to-end concurrent data transmissions on a bottleneck link is effectively ensured.

In conclusion, compared with the conventional and general TCP congestion control mechanism, the technical solution of this embodiment has the following major improvements:

1. In the "foresight" congestion control solution that is based on probe packet rehearsal transmission, congestion is avoided in advance. Compared with the traditional "hindsight" TCP method in which control is performed after congestion and a packet loss, lossless and low-latency data transmission can be ensured.

2. In the end-to-end collaborative congestion control method, the intermediate network device (a switch/router) participates in the congestion control process and reports the accurate network status to an end side. Compared with the conventional TCP congestion control only on the end side, the convergence is greatly improved.

3. The acceleration startup mechanism for the first-round data transmission is designed, to improve the transmission performance of small flows that are sensitive to transmission latency in scenarios such as WAN.

Compared with the existing lossless congestion control for the data center network, the technical solution of this embodiment has the following improvements:

1. A method for transmitting forward and return probe packets is designed. The "foresight" congestion control solution that is based on the probe packet rehearsal transmission is extended from the data center network scenario to the WAN network with more obvious route asymmetry, and becomes a common policy.

2. The acceleration startup mechanism for the first-round data transmission is designed, to improve the transmission performance of small flows that are sensitive to a transmission latency in scenarios such as the WAN without waiting for a handshake success of the probe packets.

3. The mechanism for adjust a probe packet rate based on a packet loss rate and a sending rate is designed, to adjust data transmission of each end-to-end pair to a same packet loss rate. In a WAN network scenario with a more complex network topology, fairness of data transmission on a plurality of end-to-end links can still be ensured.

In the technical solution shown in the foregoing embodiment, each time the source host receives one returned probe packet, the source host sends one data packet, and a ratio of a quantity of probe packets to a quantity of data packets is 1:1. In this case, if the source end encapsulates the data packets by using a maximum Ethernet frame 1538 B, about 5% bandwidth needs to be reserved as an independent channel for transmitting the probe packets. In an actual application environment, data packets may not be encapsulated according to the maximum Ethernet frame length of 1538 B in some special scenarios. As a result, a percentage of the reserved bandwidth may be increased. Alternatively, a network service provider needs to further optimize bandwidth overheads for transmitting the probe packets. In this scenario, a data packet sending manner needs to be changed. The ratio of the quantity of probe packets to the quantity of data packets needs to be adjusted during congestion control, to reduce link bandwidth overheads and a forwarding capability requirement of a device.

For this case, this embodiment of the present disclosure further provides an optional implementation solution, which is described as follows:

It is assumed that a network service provider needs to control a bandwidth percentage of a control channel for transmitting the probe packets within $r_{tar}$ ($r_{tar}$<5%), an average packet length of the data packets in the network is $S_{data}$, and a packet length of the probe packet is $S_{credit}$=64 KB. It should be noted herein that packet lengths of the probe packets in the network are the same. Therefore, the packet length is the packet length of the forward probe packet or the packet length of the return probe packet. In this embodiment, the packet length is set to 64 KB. In another embodiment, the packet length may alternatively be set to another length, and is not specifically limited. In this case, it is assumed that a policy in which "each time the source end receives one returned probe packet, the source end sends n data packets" is used, to ensure that a requirement of bandwidth overheads is met. A value of n may be calculated as follows:

$$S_{credit}/n*S_{data} \le r_{tar} \Leftrightarrow n = \left\lceil \frac{S_{credit}}{S_{data} \cdot r_{tar}} \right\rceil$$

In this embodiment, specific technical solutions are adjusted as follows:

(1) The ratio n of the quantity of probe packets to the quantity of data packets is calculated based on the actual average packet length and a target bandwidth of the control channel.

(2) The transmit end (the source host) sends the probe packets based on an application requirement at a target rate in a pacing mechanism to request bandwidth. The network intermediate device reserves a percentage ($r_{tar}$) of the bandwidth as the control channel to transmit the probe packets.

(3) Hop-by-hop egress ports of a forward network device perform, based on a bandwidth percentage, CAR rate limitation on probe packets aggregated by all flows, and discard a probe packet that exceeds a port capability.

(4) The receive end exchanges a source address and a destination address of a received probe packet and returns the probe packets to the transmit end at a highest priority. The return network device does not limit a probe packet rate.

(5) Each time the transmit end receives one probe packet, the transmit end immediately sends n data packets in the pacing mechanism.

(6) After one RTT period, the transmit end adjusts the probe packet sending rate based on a packet loss rate of the probe packets. After several RTT periods, the probe packets can be converged to a same packet loss rate (for example, 10%). The specific convergence algorithm is already described in detail in the foregoing embodiments, and is not described herein.

Compared with the technical solution in Embodiment 1, in the technical solution in this embodiment, a transmission control manner in which a ratio of the probe packets to the data packets is 1:1 is relaxed to a transmission control manner in which the ratio is 1:n. Each probe packet is used to control transmission of a plurality of data packets. Compared with the previous embodiment, the congestion control precision is relaxed in the technical solutions disclosed in this embodiment. To be specific, per-packet rate control is relaxed to rate control at a granularity of n packets, thereby further reducing the bandwidth overheads of the control channel. The technical solutions in this embodiment are more applicable to a scenario in which an average packet length in network transmission is relatively short and network bandwidth resources are strain.

In the technical solution shown in the foregoing embodiments, to feed back the network load status to the source node, the destination node returns all received probe packets to the source node at a highest priority. In this solution, overheads of a reserved bandwidth caused by probe packet transmission exist on both a forward path and a return path. If the network service provider wants to further reduce bandwidth overheads of the return path, the solution in Embodiment 1 may be simply extended, to avoid bandwidth overheads for transmitting the probe packets on the return path. Based on this, in one embodiment, the following technical solutions may be provided:

In this embodiment, specific technical solutions are adjusted as follows:

(1) A transmit end (the source host) sends probe packets based on an application requirement at a target rate in a pacing mechanism to request bandwidth. An intermediate network device reserves a specific percentage of bandwidth as a control channel to transmit the probe packets.

(2) Hop-by-hop egress ports of the forward network device perform, based on the bandwidth percentage, CAR rate limitation on probe packets aggregated by all flows, and discard a probe packet that exceeds a port capability.

(3) After receiving the probe packets, a receive end calculates a packet loss rate and a receiving rate of the probe packets by using a specific period as a time unit (for example, one RTT), and sends a signal to the transmit end to notify the transmit end of a current receiving rate and a current packet loss rate of the probe packets.

(4) After receiving the rate notification signal returned by the receive end, the transmit end sends data packets in a pacing mechanism at the rate.

(5) After one RTT period, the transmit end adjusts the probe packet sending rate based on the packet loss rate of the probe packets. The adjustment needs to be performed in each RTT period until the probe packets are converged to a same packet loss rate (for example, 10%). The specific convergence algorithm is already described in detail in the foregoing embodiments, and is not described herein.

Compared with the technical solution in the foregoing embodiment, a step in which the receive end returns the probe packets is cancelled in the technical solution in this embodiment. Instead, the receive end directly calculates the data packet sending rate, and reports the sending rate to the transmit end through signal transmission. Compared with the technical solution in Embodiment 1, in this solution, bandwidth overheads of the control channel for transmitting the probe packets are reduced by half. In contrast, congestion control precision is relaxed from per-packet rate control to multi-packet rate control within one RTT.

Figure 11:
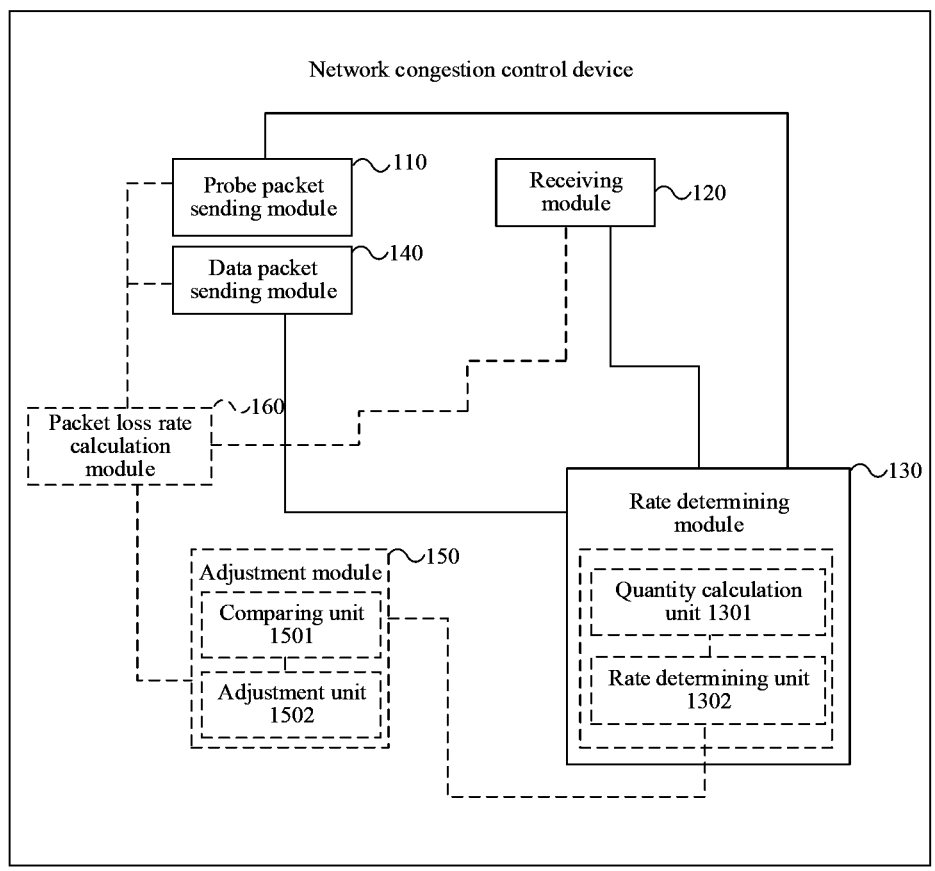
FIG. 11 is a structural diagram of a network congestion control device according to an embodiment.

As shown in FIG. 11, an embodiment of the present disclosure provides a network congestion control device. The control device includes:

a probe packet sending module 110, configured to send forward probe packets to a destination device at a preset initialized rate, where some or all of the forward probe packets arrive at the destination device after being rate-limited forwarded by an intermediate device in a network by using a reserved bandwidth of an egress port of the intermediate device;

a receiving module 120, configured to receive return probe packets returned by the destination device, where the return probe packets correspond to forward probe packets received by the destination device;

a rate determining module 130, configured to determine a data packet sending rate based on the return probe packets received by the receiving module 120; and a data packet sending module 140, configured to send a data packet at the sending rate determined by the rate determining module 130.

In an instance, the rate determining module 13 is specifically configured to enable the data packet sending module 140 to send one data packet each time one return probe packet is received.

As shown in a dashed box in FIG. 11, in an embodiment, the rate determining module 130 includes a quantity calculation unit 1301 and a rate determining unit 1302.

The quantity calculation unit 1301 is configured to calculate, based on an average packet length of data packets in the network, a packet length of a probe packet, and a percentage of the reserved bandwidth of the egress port of the intermediate device in the network in a total bandwidth of the egress port of the intermediate device, a quantity n of to-be-sent data packets corresponding to each return probe packet, where n is a natural number.

In one embodiment, the quantity calculation unit calculates the quantity n according to a formula $$n = \left\lceil \frac{S_{credit}}{S_{data} \cdot r_{tar}} \right\rceil,$$

where $r_{tar}$ is the percentage of the reserved bandwidth of the egress port of the intermediate device in the network in the total bandwidth of the egress port, $S_{data}$ is the average packet length of the data packets in the network, $S_{credit}$ is the packet length of the probe packets in the network, and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

The rate determining unit 1302 is configured to enable the data packet sending module 140 to send n data packets each time one return probe packet is received.

As shown in a dashed box in FIG. 11, in an embodiment, the device further includes:

a packet loss rate calculation module 160, configured to calculate, by using a preset period as a time unit, a packet loss rate of the forward probe packets in the time unit based on a quantity of return probe packets received by the receiving module 120 and a quantity of forward probe packets sent by the probe packet sending module 110.

In this case, the rate determining unit 1302 is specifically configured to determine the data packet sending rate based on the packet loss rate obtained through calculation by the packet loss rate calculation module 160 and the initialized rate.

As shown in a dashed box in FIG. 11, in an embodiment, the device further includes:

an adjustment module 150, configured to periodically adjust, by using a preset period as a time unit, a sending rate of the forward probe packets based on the packet loss rate of the forward probe packets obtained through calculation by the packet loss rate calculation module 160.

As shown in a dashed box in FIG. 11, in an embodiment, the adjustment module 150 may include:

a comparing unit 1501, configured to compare the packet loss rate of the forward probe packets with a target packet loss rate in a current period; and an adjustment unit 1502, configured to adjust, based on a comparing result of the comparing unit 1501, a sending rate of to-be-sent forward probe packets in a next period.

In one embodiment, the adjustment unit 1502 is specifically configured to: if the packet loss rate of the forward probe packets is lower than the target packet loss rate, increase the sending rate of the forward probe packets in the next period.

In one embodiment, when the sending rate of the forward probe packets in the next period needs to be increased, the sending rate of the probe packets in the next period is calculated according to a formula: next_rate=cur_rate×[1+(tar_loss−cur_loss)×(max_rate−cur_rate)/cur_rate]. Certainly, this is only a rate increase method in this embodiment of the present disclosure, and there may be another rate increase method in another embodiment, for example, the rate is increased by a fixed percentage, for example, the rate is increased by 5%.

If the packet loss rate of the forward probe packets is higher than the target packet loss rate, the sending rate of the forward probe packets in the next period is decreased.

In one embodiment, when the sending rate of the forward probe packets in the next period needs to be decreased, the sending rate of the probe packets in the next period is calculated according to a formula: next_rate=cur_rate×[1−(cur_loss−tar_loss)×max_rate/(max_rate−cur_rate)]. Certainly, this is only a rate increase method in this embodiment of the present disclosure, and there may be another rate decrease method in another embodiment, for example, the rate is decreased by a fixed percentage, for example, the rate is decreased by 5%.

In the foregoing formulas, cur_rate is a probe packet sending rate in the current period, next_rate is a preset probe packet sending rate in a next period, tar_loss is the target packet loss rate of the probe packets, cur_loss is the packet loss rate of the probe packets in the current period, and max_rate is a maximum sending rate allowed in the network.

In conclusion, compared with a general congestion control mechanism in a conventional TCP, lossless low-latency congestion control on a data transmission process is implemented in a more general WAN network scenario other than a data center. In this embodiment, according to the method for transmitting probe packets in forward and return paths, a path asymmetry problem in the WAN network scenario is resolved, and lossless congestion control in a more general scenario is implemented. The network congestion control device in the technical solution of this embodiment can implement a "foresight" congestion control solution that is based on probe packet rehearsal transmission, to avoid congestion in advance. Compared with a "hindsight" device that performs control after congestion and a packet loss occur in a conventional TCP, lossless and low-latency data transmission can be ensured. Further, in the end-to-end collaborative congestion control, the intermediate device (switch/router) in the network participates in the congestion control process and report an accurate network status to the end side. Compared with congestion control performed only on the end side in the conventional TCP, the convergence is greatly improved. A mechanism for adjusting a probe packet rate based on a current packet loss rate and a sending rate is designed, to ensure fairness of a plurality of end-to-end data transmissions.

Figure 14:
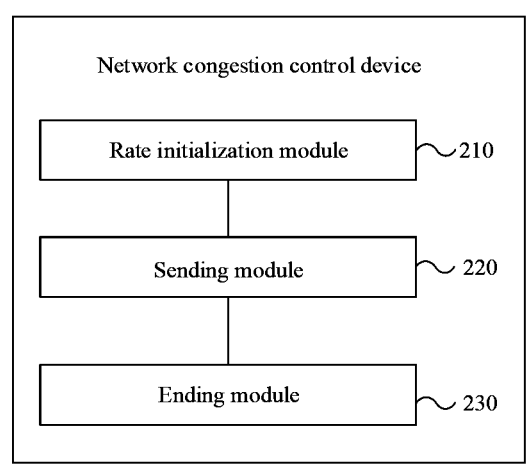
FIG. 14 is a structural diagram of a network congestion control device according to an embodiment.

As shown in FIG. 14, an embodiment of the present disclosure provides a network congestion control device. The control device includes:

a rate initialization module 210, configured to initialize first-round sending rates of probe packets and data packets based on an application bandwidth requirement, where the first-round sending rate of the probe packets is higher than the application bandwidth requirement, and the first-round sending rate of the data packets is lower than the application bandwidth requirement;

a sending module 220, configured to send the probe packets and the data packets to a destination device at the respective first-round sending rates; and an ending module 230, configured to: when probe packets returned by the destination device are received, end first-round sending of the data packets.

The data packets and the probe packets are both sent in a pacing mechanism. Certainly, it may be understood that in another embodiment, the probe packets and the data packets may alternatively be sent in another mode, for example, a windows mechanism.

By using the network congestion control device provided in this embodiment, during the first-round data transmission, the source end (the transmit end) directly transmits the data packets at a relatively low rate without waiting for a returned probe packet. A one-RTT handshake latency is reduced for the first-round data transmission. In a scenario such as a WAN network scenario, small flow transmission performance is improved, and performance loss caused by a relatively long handshake latency to the small flow is reduced in the WAN network scenario.

Figure 12:
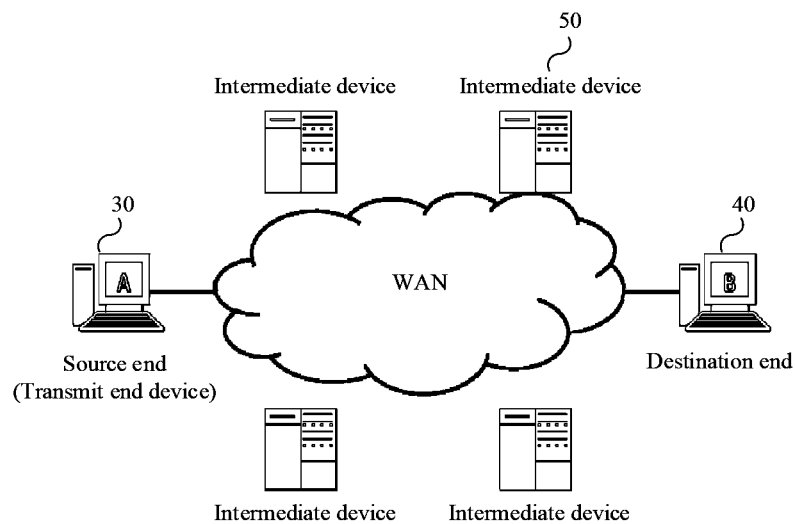
FIG. 12 is a structural diagram of a network congestion control system according to an embodiment.

Further, as shown in FIG. 12, an embodiment of the present disclosure further provides a network congestion control system, and the system includes a transmit end device 30, an intermediate device 50, and a destination device 40.

The transmit end device 30 is configured to send forward probe packets at a preset initialized rate.

The intermediate device 50 in the network is configured to discard, based on a reserved bandwidth of an egress port of the intermediate device, a forward probe packet whose sending rate exceeds the reserved bandwidth, and rate-limited forward the forward probe packets.

The destination device 40 is configured to receive return probe packets returned by the intermediate device and return probe packets to the transmit end device, where the return probe packets correspond to forward probe packets received by the destination device.

The transmit end device 30 is further configured to receive the return probe packets, determine a data packet sending rate based on the received return probe packets, and send a data packet at the sending rate.

In one embodiment, the intermediate device 50 in the network is further configured to forward the return probe packets by using a regular bandwidth of the egress port of the intermediate device. The regular bandwidth is a bandwidth other than the reserved bandwidth, the regular bandwidth is greater than an application-layer bandwidth requirement, and the reserved bandwidth is less than the application-layer bandwidth requirement.

The specific reservation rule is already described in detail in the foregoing embodiments, and is not described herein again.

In one embodiment, the transmit end device sends one data packet each time the transmit end device receives one return probe packet. Certainly, another sending mechanism in the foregoing embodiment may alternatively be used, and is not described herein again because the another sending mechanism is described in detail in the foregoing embodiments.

Likewise, further, as shown in FIG. 12, the transmit end device 30, the intermediate device 50, and the destination device 40 in the system may further implement the following functions:

The transmit end device 30 is configured to send forward probe packets at a preset initialized rate.

The intermediate device 50 in the network is configured to discard, based on a reserved bandwidth of an egress port of the intermediate device, a forward probe packet whose sending rate exceeds the reserved bandwidth, and rate-limited forward the forward probe packets.

The destination device 40 is configured to receive the forward probe packets forwarded by the intermediate device 50, and determine, by using a preset period as a time unit, a packet loss rate of the forward probe packets in the period based on the received forward probe packet.

The destination device 40 is further configured to determine a data packet sending rate in a next period based on the packet loss rate of the forward probe packets, and notify the transmit end device of the data packet sending rate.

The transmit end device 30 is further configured to send a data packet at the sending rate in the next period.

In one embodiment, the intermediate device 50 in the network is further configured to forward the return probe packets by using a regular bandwidth of the egress port of the intermediate device. The regular bandwidth is a bandwidth other than the reserved bandwidth, the regular bandwidth is greater than an application-layer bandwidth requirement, and the reserved bandwidth is less than the application-layer bandwidth requirement.

The specific reservation rule is already described in detail in the foregoing embodiments, and is not described herein again.

In one embodiment, the transmit end device sends one data packet each time the transmit end device receives one return probe packet. Certainly, another sending mechanism in the foregoing embodiment may alternatively be used, and is not described herein again because the another sending mechanism is described in detail in the foregoing embodiments.

In one embodiment, during first-round data packet transmission, the transmit end device may use a first-round sending policy described in the foregoing embodiment, to reduce a one-RTT handshake latency for the first-round data transmission.

In conclusion, compared with a general congestion control mechanism in a conventional TCP, lossless low-latency congestion control on a data transmission process is implemented in a more general WAN network scenario other than a data center. In this embodiment, according to the method for transmitting probe packets in forward and return paths, a path asymmetry problem in the WAN network scenario is resolved, and lossless congestion control in a more general scenario is implemented. The network congestion control device in the technical solution of this embodiment can implement a "foresight" congestion control solution that is based on probe packet rehearsal transmission, to avoid congestion in advance. Compared with a "hindsight" device that performs control after congestion and a packet loss occur in a conventional TCP, lossless and low-latency data transmission can be ensured. Further, in the end-to-end collaborative congestion control, the intermediate device (e.g., switch/router) in the network participates in the congestion control process and report an accurate network status to the end side. Compared with congestion control performed only on the end side in the conventional TCP, the convergence is greatly improved. A mechanism for adjusting a probe packet rate based on a current packet loss rate and a sending rate is designed, to ensure fairness of a plurality of end-to-end data transmissions.

Figure 16:
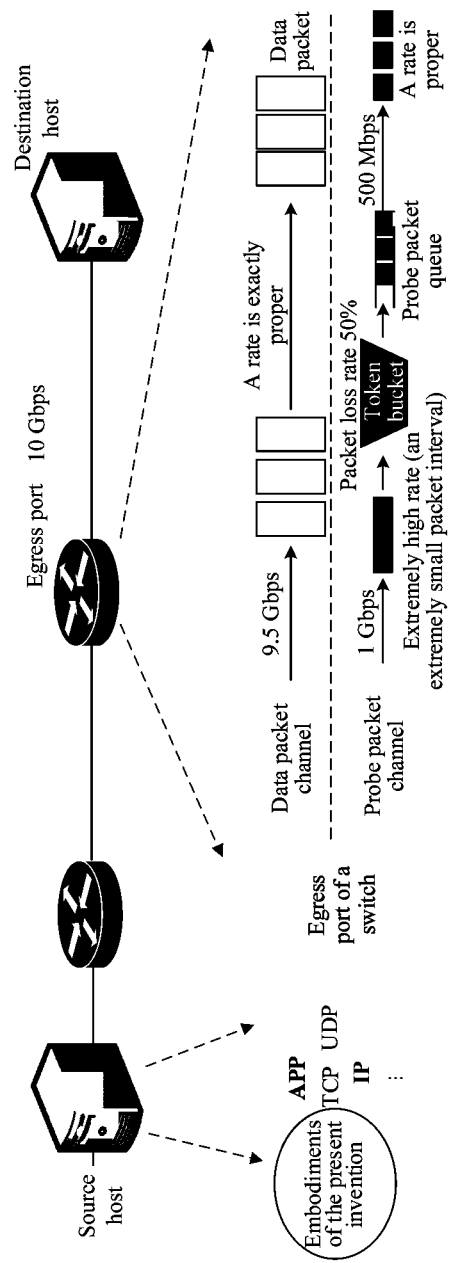
FIG. 16 is a schematic diagram of an implementation solution of a related product according to an embodiment.

FIG. 16 is a schematic flowchart of implementation solution of a related product according to an embodiment of the present disclosure. To implement the congestion control policy designed in the embodiments of the present disclosure, an operating system kernel of an end side node (e.g., a source/destination host) needs to be correspondingly modified. The congestion control policy in the embodiments of the present disclosure is written into a kernel protocol stack as a new transport layer protocol, the new transport layer protocol is parallel to conventional transport layer protocols such as a TCP and a UDP.

In addition, an intermediate device (such as a switch) needs to be modified at software level. The intermediate device needs to reserve a buffer for the probe packets to buffer a burst of the probe packets. A percentage of bandwidth needs to be reserved on the egress port of the switch for transmitting the probe packets. The switch discards a probe packet transmitted beyond a rate limit, to ensure that the probe packet sending rate matches the reserved bandwidth. Normal data packets are transmitted by using a link bandwidth other than the reserved bandwidth. The probe packet rate is adjusted. Therefore, the data packet sending rate directed based on the probe packet rate is exactly proper. In this way, lossless and fast-convergence congestion control is implemented through mutual collaboration between the end node and the intermediate device.

As shown in FIG. 16, in one embodiment, a 0.5 Gbps bandwidth is reserved on the egress port of the intermediate device to transmit the probe packets. The remaining 9.5 Gbps is used as a regular bandwidth to transmit the data packets. When the probe packets are sent at a 1 Gpbs rate, half of the data packets are discarded because the bandwidth is only 0.5 Gbps. The packet loss rate is 50%. After the packets pass a token bucket, the probe packets at a rate of 500 Mbps are left. It should be noted that, a token bucket algorithm is a most commonly used algorithm in network traffic shaping and rate limiting. Typically, the token bucket algorithm is used to control a quantity of data packets to be sent to a network and allow burst data transmission.

Figure 17:
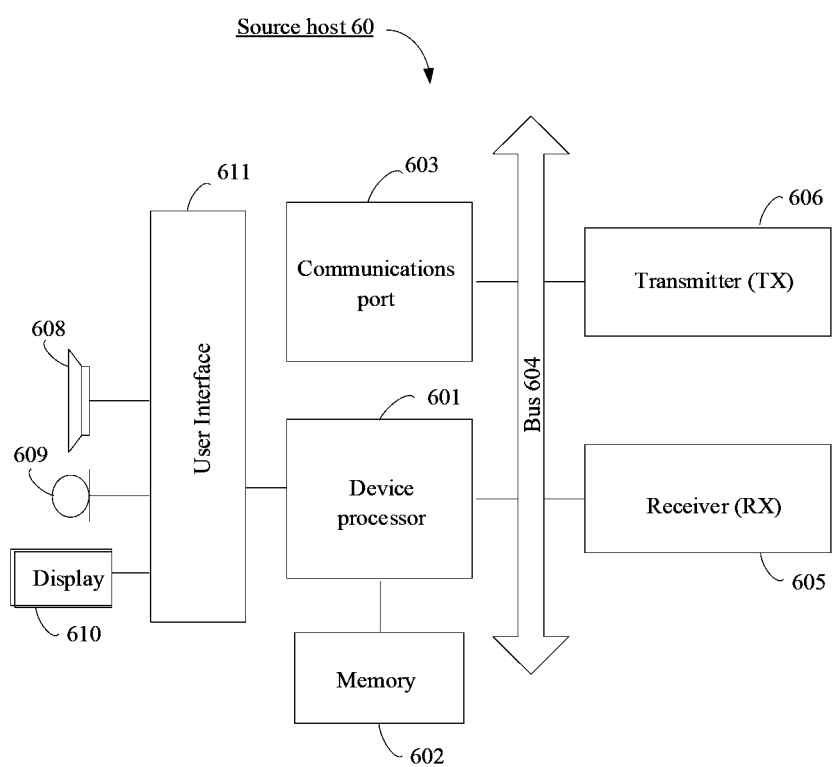
FIG. 17 is a schematic structural diagram of a transmit end device according to an embodiment.

FIG. 17 is a schematic structural diagram of a source device (a transmit end device) 60 according to an embodiment. As shown in FIG. 17, the source device 60 includes: one or more device processors 601, memories 602, communications interfaces 603, receivers 605, transmitters 606, and input/output modules (including a feedback signal collection module 607, an audio input/output module 608, a key input module 609, a display 610, and the like). It should be noted that, these components of the source device may be connected by using a bus 604 or in another manner. In FIG. 6A and FIG. 6B, for example, these components are connected by using the bus.

The communications interface 603 may be configured for communication between the source device 60 and another communication device, for example, an image recognition device. Specifically, the communications interface 603 may be a wired communications interface 603, for example, a local area network (LAN) interface. The source device 60 is not limited to the wired communications interface, and may alternatively be configured with a long term evolution (LTE) (4G) communications interface, or may be configured with a 5G interface or a future new radio communications interface.

The transmitter 606 may be configured to perform transmission processing, for example, signal modulation, on a signal output by the device processor 601. The receiver 605 may be configured to perform receiving processing, for example, signal demodulation, on a received signal. In some embodiments of this application, the transmitter 606 and the receiver 605 may be considered as a wireless modem. There may be one or more transmitters 606 and receivers 605 in the source device 60.

In addition to the transmitter 606 and the receiver 605 shown in FIG. 6A and FIG. 6B, the source device 60 may further include another communications component, such as a GPS module, a Bluetooth module, or a Wi-Fi module. In addition to the foregoing described wireless communications signal, the source device 60 may support another wireless communications signal, for example, a satellite signal or a short wave signal. In addition to supporting wireless communication, the source device 60 may be provided with a wired network interface (for example, a LAN interface) to support wired communication.

The input/output module may be configured to implement interaction between the source device 60 and a user/an external environment, and may mainly include a feedback signal collection module 607, an audio input/output module 608, a key input module 609, and a display 610. The feedback signal collection module 607 is configured to collect a feedback signal of an observation object 30. Specifically, the input/output module may also include a camera, a touchscreen, a sensor, and the like. All the input/output modules communicate with the device processor 601 through a user interface 611.

The memory 602 is coupled to the device processor 601, and is configured to store various software programs and/or a plurality of sets of instructions. Specifically, the memory 602 may include a high-speed random access memory, and may include a non-volatile memory, for example, one or more disk storage devices, flash memory devices, or other non-volatile solid-state storage devices. The memory 602 may store an operating system (briefly referred to as a system in the following), for example, an embedded operating system such as ANDROID, IOS, WINDOWS, or LINUX. The memory 602 may further store a network communication program. The network communication program may be used to communicate with one or more additional devices. The memory 606 may further store a user interface program. The user interface program may vividly display content of an application program by using a graphical operation interface, and receive control operations of a user for the application program by using input controls such as menus, dialog boxes, and keys.

In some embodiments, the memory 602 may be configured to store an implementation program of the network congestion control method on a side of the source device 60 provided in one or more embodiments of this application. Alternatively, the memory 602 may be configured to store an implementation program of the network congestion control method on a side of the source device 60 provided in one or more embodiments of this application. Alternatively, the memory 602 may be configured to store an implementation program of the network congestion control method on a side of the source device 60 provided in one or more embodiments of this application. Alternatively, the memory 602 may be configured to store an implementation program of the network congestion control method on a side of the source device 60 provided in one or more embodiments of this application. For implementation of the network congestion control method provided in one or more embodiments of this application, refer to subsequent embodiments.

The device processor 601 may be configured to read and execute a computer readable instruction. Specifically, the device processor 601 may be configured to invoke the program stored in the memory 602, for example, an implementation program of the network congestion method on the side of the source device 60 provided in one or more embodiments of this application, or an implementation program of the first-round data sending method on the side of the source device 60 provided in one or more embodiments of this application, and execute an instruction included in the program.

In an example of the implementation program of the network congestion method on the side of the source device 60, when the processor 601 may be configured to invoke an implementation program, stored in the memory 602, of the network congestion method on the side of the source device, the following steps are performed:

enabling the transmitter 606 to send forward probe packets to a destination device at a preset initialized rate, where some or all of the forward probe packets arrive at the destination device after being forwarded by an intermediate device in a network by using a reserved bandwidth of an egress port of the intermediate device;

enabling the receiver 605 to receive return probe packets returned by the destination device, where the return probe packets correspond to forward probe packets received by the destination device; and determining, by the device processor 601 or by enabling the communications interface 603, a data packet sending rate based on the received return probe packets, and enabling the transmitter 606 to send a data packet at the sending rate.

The more specific steps are already described in detail in the foregoing embodiments, and are not described herein again.

In an example of the implementation program of the first-round data sending method on the side of the source device, when the processor 601 may be configured to invoke an implementation program, stored in the memory 602, of the network congestion method on the side of the source device, the following steps are performed:

initializing first-round sending rates of probe packets and data packets based on an application bandwidth requirement, where the first-round sending rate of the probe packets is higher than the first-round sending rate of the data packets;

enabling the transmitter 606 to send the probe packets and the data packets to a destination device at the respective first-round sending rates; and when the receiver 605 receives probe packets returned by the destination device, enabling the transmitter 606 to end first-round data packet sending.

In conclusion, the embodiments of the present disclosure provide a lossless low-latency end-to-end congestion control policy in a general network scenario.

In a "foresight" congestion control solution that is based on probe packet rehearsal transmission, the data packet sending rate is adjusted based on the probe packet sending rate. In this way, congestion can be avoided in advance and network transmission can be lossless.

According to method for transmitting probe packets in forward and return paths, the "foresight" congestion control solution that is based on probe packet rehearsal transmission can be applicable to a WAN network with more obvious asymmetry, and becomes a general congestion control method.

An acceleration startup mechanism is used for first-round data transmission, to directly send the data packets at a conservative rate without waiting for a handshake success of the probe packets, and improve the transmission performance of small flows that are sensitive to a transmission latency in scenarios such as the WAN network.

A mechanism for adjusting a probe packet rate based on a packet loss rate and a sending rate is used, to adjust data transmission of all end-to-end pairs to a same packet loss rate, and ensure fairness of data transmission on a plurality of end-to-end links.

A congestion control policy in this embodiments of the present disclosure is applicable to a general network scenario such as the WAN network or a DCN network.

Beneficial effects corresponding to the technical points in the embodiments of the present disclosure are summarized as follows:

By applying the congestion control solution that is based on probe packet rehearsal transmission in the embodiments of the present disclosure, low-latency and no-packet-loss (lossless) data transmission in the network can be implemented. Compared with a "hindsight" TCP control solution that is based on a congestion signal, in the "foresight" congestion control solution that is based on the probe packet rehearsal transmission, network congestion can be avoided in advance, and lossless data transmission can be ensured.

By applying the end-to-end collaborative congestion control solution in the embodiments of the present disclosure, a convergence speed of a congestion control policy can be greatly improved. Compared with the prior art solution 1, an end-to-end collaborative congestion control solution is used in the technical solution in this embodiment of the present disclosure, and the network intermediate device participates in the congestion control process and accurately feeds back a real-time network status to an end side. Therefore, the end side can accurately perceive the network status, and directly adjust data transmission to a most proper rate, thereby avoiding a problem of poor convergence caused by repeated attempts in a solution implemented only on the end side.

By applying the probe packet transmission method on the forward and return paths in the solution in the embodiments of the present disclosure, an asymmetric routing problem can be resolved in the general network scenario. Compared with the prior art, the present disclosure breaks a limitation on the data center network scenario, so that the congestion control solution in the embodiments of the present disclosure becomes a general congestion control mechanism like a conventional TCP protocol.

By applying the acceleration startup mechanism in the solution in the embodiments of the present disclosure, small flow transmission performance can be improved. Compared with the prior art, the acceleration startup mechanism in the technical solutions of the embodiments of the present disclosure advances data transmission of the source host by one RTT time. In the WAN network scenario with a relatively long RTT, a probe packet handshake latency of one RTT time is reduced, and the small flow transmission performance can be greatly improved.

By applying the probe packet rate adjustment mechanism in the solution in this embodiment of the present disclosure, end-to-end transmission fairness can be ensured. Compared with the data center network scenario in the prior art, a network topology of the WAN network scenario in the embodiments of the present disclosure is more complex. In this case, the mechanism for adjusting the probe packet rate based on the packet loss rate and the sending rate designed in this solution is applied to converge transmission of each pair of end-to-end probe packets to a same packet loss rate, so that a bottleneck link bandwidth can be used fairly for all end-to-end communications, transmission fairness is ensured.

A person of ordinary skill in the art may understand that all or some steps for implementing the foregoing embodiments may be implemented by using hardware or a program instructing related hardware. The steps of the methods disclosed with reference to the embodiments of the present disclosure may be directly performed and completed by a combination of hardware and software modules in the processor. When the steps are implemented by using software, code that implements the foregoing functions may be stored in a computer readable medium. The computer readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

The foregoing descriptions are merely examples of the embodiments of the present disclosure, but are not intended to limit the embodiments of the present disclosure. Any modification, equivalent replacement, and improvement made without departing from the spirit and principle of the embodiments of the present disclosure shall fall within the protection scope of the embodiments of the present disclosure.

What is claimed is:

1. A method of network congestion control, comprising:
sending, by a transmit end device, forward probe packets to a destination device at a preset initialized rate, wherein some or all of the forward probe packets arrive at the destination device after being forwarded by an intermediate device in a network by using a reserved bandwidth of an egress port of the intermediate device;
receiving return probe packets returned by the destination device, wherein the return probe packets correspond to the forward probe packets received by the destination device; and
determining a data packet sending rate based on the received return probe packets, and sending a data packet at the data packet sending rate, wherein the data packet arrives at the destination device after being forwarded by the intermediate device by using a link bandwidth other than the reserved bandwidth of the egress port of the intermediate device.

2. The method according to claim 1, wherein sending the data packet at the data packet sending rate comprises:
sending, by the transmit end device, one data packet each time one return probe packet is received.

3. The method according to claim 1, wherein
determining the data packet sending rate based on the received return probe packets comprises: calculating, based on an average packet length of data packets in the network, a packet length of the return probe packet, and a percentage of the reserved bandwidth of the egress port of the intermediate device in the network in a total bandwidth of the egress port of the intermediate device, a quantity n of data packets corresponding to each return probe packet, wherein n is a natural number, and the packet length of the return probe packet is the same as a packet length of the forward probe packet; and
sending the data packet at the data packet sending rate comprises: sending, by the transmit end device, n data packets each time one return probe packet is received.

4. The method according to claim 3, wherein n is calculated according to a formula $$n = \left\lceil \frac{S_{credit}}{S_{data} \cdot r_{tar}} \right\rceil,$$

wherein $r_{tar}$ is the percentage of the reserved bandwidth of the egress port of the intermediate device in the network in the total bandwidth of the egress port of the intermediate device, $S_{data}$ is the average packet length of the data packets in the network, $S_{credit}$ is the packet length of the return probe packet, and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

5. The method according to claim 3, wherein the n data packets are sent in a pacing mechanism.

6. The method according to claim 1, wherein the forward probe packets are sent in a pacing mechanism.

7. The method according to claim 1, wherein determining the data packet sending rate based on the return probe packets comprises:
calculating a packet loss rate of the forward probe packets in a preset period based on a quantity of the received return probe packets and a quantity of the sent forward probe packets in the preset period, and
determining the data packet sending rate based on the packet loss rate and the preset initialized rate.

8. The method according to claim 7, wherein the preset period is one round-trip time (RTT) period.

9. The method according to claim 7, wherein the preset period is determined based on a latency requirement of a service flow.

10. The method according to claim 1, further comprising:
periodically adjusting, by the transmit end device, a sending rate of the forward probe packets in a next period based on a packet loss rate of the forward probe packets in one period, wherein the packet loss rate of the forward probe packets is obtained by the transmit end device through calculation based on a quantity of the returned return probe packets that are received by the transmit end device and a quantity of the sent forward probe packets in the period.

11. The method according to claim 10, wherein periodically adjusting the sending rate of the forward probe packets based on the packet loss rate of the forward probe packets comprises:
comparing the packet loss rate of the forward probe packets with a target packet loss rate in a current period, and
performing different rate adjustment on the sending rate of the forward probe packets based on a comparing result.

12. The method according to claim 11, wherein performing the different rate adjustment on the sending rate of the forward probe packets based on the comparing result comprises:
when the packet loss rate of the forward probe packets is lower than the target packet loss rate, increasing the sending rate of the forward probe packets in the next period, and
when the packet loss rate of the forward probe packets is higher than the target packet loss rate, decreasing the sending rate of the forward probe packets in the next period.

13. The method according to claim 12, wherein
increasing the sending rate of the forward probe packets in the next period comprises: calculating the sending rate of the probe packets in the next period according to a formula:

next_rate=cur_rate×[1+(tar_loss−cur_loss)× (max_rate−cur_rate)/cur_rate]; and decreasing the sending rate of the forward probe packets in the next period comprises: calculating the sending rate of the probe packets in the next period according to a formula:

next_rate=cur_rate×[1−(cur_loss−tar_loss)× max_rate/(max_rate−cur_rate)];

wherein the cur_rate is a probe packet sending rate in the current period, next_rate is a preset probe packet sending rate in the next period, tar_loss is the target packet loss rate of the probe packets, cur_loss is the packet loss rate of the probe packets in the current period, and max_rate is a maximum sending rate allowed in the network.

14. The method according to claim 1, further comprising:
initializing, by a transmit end device, a first-round sending rate of probe packets and a first-round sending rate of data packets based on an application bandwidth requirement, wherein the first-round sending rate of the probe packets is higher than the first-round sending rate of the data packets;
sending the probe packets and the data packets to a destination device at the respective first-round sending rates of the probe packets and the data packets; and
ending first-round sending of the data packets when probe packets returned by the destination device are received.

15. The method according to claim 14, wherein the probe packets are sent in a pacing mechanism.

16. A method of network congestion control, comprising:
sending, by a transmit end device, forward probe packets at a preset initialized rate;
discarding, by an intermediate device in a network based on a reserved bandwidth of an egress port of the intermediate device, a forward probe packet whose sending rate exceeds the reserved bandwidth, and forwarding the forward probe packets;
receiving, by a destination device, the forward probe packets forwarded by the intermediate device;
returning, by the destination device, return probe packets to the transmit end device, wherein the return probe packets correspond to the forward probe packets received by the destination device;
receiving, by the transmit end device, the return probe packets;
determining, by the transmit end device, a data packet sending rate based on the received return probe packets, and sending a data packet at the data packet sending rate;
forwarding, by the intermediate device, the data packet using a link bandwidth other than the reserved bandwidth of the egress port of the intermediate device; and receiving, by the destination device, the data packet forwarded by the intermediate device.

17. The method according to claim 16, further comprising:

forwarding, by the intermediate device in the network, the return probe packets by using a regular bandwidth of the egress port of the intermediate device, wherein the regular bandwidth is a bandwidth other than the reserved bandwidth, the regular bandwidth is greater than an application-layer bandwidth requirement, and the reserved bandwidth is less than the application-layer bandwidth requirement.

18. The method according to claim 16, wherein a sending priority of the return probe packets is set to a highest priority.

19. The method according to claim 16, wherein sending the data packet at the data packet sending rate comprises:

sending, by the transmit end device, one data packet each time one return probe packet is received.

20. The method according to claim 19, wherein determining the data packet sending rate based on the received return probe packets comprises:

calculating, based on an average packet length of data packets in the network, a packet length of the return probe packet, and a percentage of the reserved bandwidth of the egress port of the intermediate device in the network in a total bandwidth of the egress port of the intermediate device, a quantity n of data packets corresponding to each return probe packet, wherein n is a natural number, and the packet length of the return probe packet is the same as a packet length of the forward probe packet; and sending, by the transmit end device, n data packets each time one return probe packet is received, wherein n is a natural number.

21. The method according to claim 20, wherein a quantity n of to-be-sent data packets corresponding to each return probe packet is calculated according to a formula $$n = \left\lceil \frac{S_{credit}}{S_{data} \cdot r_{tar}} \right\rceil,$$

wherein $r_{tar}$ is the percentage of the reserved bandwidth of the egress port of the intermediate device in the network in the total bandwidth of the egress port of the intermediate device, $S_{data}$ is the average packet length of the data packets in the network, $S_{credit}$ is the packet length of the return probe packet, and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

22. The method according to claim 16, wherein a buffer is configured on the intermediate device in the network; and discarding the forward probe packet whose sending rate exceeds the reserved bandwidth comprises:

when the forward probe packet occupies all of the buffer, discarding the forward probe packet whose sending rate exceeds the reserved bandwidth.

23. A network congestion control device, comprising:

a processor; and a memory coupled to the processor to store instructions, which when executed by the processor, cause the processor to perform operations, the operations including:

sending forward probe packets to a destination device at a preset initialized rate, wherein some or all of the forward probe packets arrive at the destination device after being rate-limited forwarded by an intermediate device in a network by using a reserved bandwidth of an egress port of the intermediate device;

receiving return probe packets returned by the destination device, wherein the return probe packets correspond to the forward probe packets received by the destination device;

determining a data packet sending rate based on the return probe packets; and sending a data packet at the data packet sending rate, wherein the data packet arrives at the destination device after being forwarded by the intermediate device by using a link bandwidth other than the reserved bandwidth of the egress port of the intermediate device.

24. The network congestion control device according to claim 23, wherein sending the data packet at the data packet sending rate comprises: sending one data packet each time one return probe packet is received.

25. The network congestion control device according to claim 24, wherein determining the data packet sending rate comprises: calculating, based on an average packet length of the data packets in the network, a packet length of the return probe packet, and a percentage of the reserved bandwidth of the egress port of the intermediate device in the network in a total bandwidth of the egress port of the intermediate device, a quantity n of to-be-sent data packets corresponding to each return probe packet, wherein n is a natural number, and the packet length of the return probe packet is the same as a packet length of the forward probe packet; and sending the data packet at the data packet sending rate comprises: sending n data packets each time one return probe packet is received.

26. The network congestion control device according to claim 25, wherein calculating the quantity n of the to-be-sent data packets corresponding to each return probe packet comprises: calculating the quantity n according to a formula $$n = \left\lceil \frac{S_{credit}}{S_{data} \cdot r_{tar}} \right\rceil,$$

wherein $r_{tar}$ is the percentage of the reserved bandwidth of the egress port of the intermediate device in the network in the total bandwidth of the egress port of the intermediate device, $S_{data}$ is the average packet length of the data packets in the network, $S_{credit}$ is the packet length of the return probe packet, and $$\left\lceil \frac{S_{credit}}{S_{data} \cdot r_{tar}} \right\rceil$$

indicates that $$\frac{S_{credit}}{S_{data} \cdot r_{tar}}$$

is rounded up.

27. The network congestion control device according to claim 23, wherein the operations further include:
calculating a packet loss rate of the forward probe packets in a time unit based on a quantity of the return probe packets and a quantity of the sent forward probe packets in the preset period; and
determining the data packet sending rate based on the packet loss rate and the preset initialized rate.

28. The network congestion control device according to claim 27, wherein the operations further include:
periodically adjusting a sending rate of the forward probe packets in a next period based on the packet loss rate.

29. The network congestion control device according to claim 28, wherein periodically adjusting the sending rate of the forward probe packets in the next period comprises:
comparing a packet loss rate of the probe packets with a target packet loss rate in a current period, and
adjusting a sending rate of to-be-sent probe packets in the next period based on a comparing result.

30. The network congestion control device according to claim 23, wherein the operations further include:
initializing a first-round sending rate of probe packets and a first-round sending rate of data packets based on an application bandwidth requirement, wherein the first-round sending rate of the probe packets is higher than the application bandwidth requirement, and the first-round sending rate of the data packets is lower than the application bandwidth requirement;
sending the probe packets and the data packets to a destination device at the respective first-round sending rates of the probe packets and the data packets; and
ending first-round sending of the data packets when probe packets returned by the destination device are received.

31. The network congestion control device according to claim 30, wherein
the probe packets are all sent in a pacing mechanism.

32. A network congestion control system, comprising:
a transmit end device configured to send forward probe packets at a preset initialized rate;
an intermediate device in a network configured to discard, based on a reserved bandwidth of an egress port of the intermediate device, a forward probe packet whose sending rate exceeds the reserved bandwidth, and forward the forward probe packets; and
a destination device configured to receive the forward probe packets forwarded by the intermediate device, and return probe packets to the transmit end device, wherein the return probe packets correspond to the forward probe packets received by the destination device;
wherein the transmit end device is further configured to receive the return probe packets, determine a data packet sending rate based on the received return probe packets, and send a data packet at the data packet sending rate;
wherein the intermediate device is further configured to forward the data packet through a link bandwidth other than the reserved bandwidth of the egress port of the intermediate device;
wherein the destination device is further configured to receive the data packet forwarded by the intermediate device.

33. The network congestion control system according to claim 32, wherein the intermediate device in the network is further configured to forward the return probe packets by using a regular bandwidth of the egress port of the intermediate device, wherein the regular bandwidth is a bandwidth other than the reserved bandwidth, the regular bandwidth is greater than an application-layer bandwidth requirement, and the reserved bandwidth is less than the application-layer bandwidth requirement.

34. The network congestion control system according to claim 32, wherein to send the data packet at the data packet sending rate, the transmit end device sends one data packet each time the transmit end device receives one return probe packet.

35. A method of congestion control in a network, comprising:
sending, by a transmit end device, forward probe packets to a destination device at a preset initialized rate, wherein some or all of the forward probe packets arrive at the destination device after being forwarded by an intermediate device in a network by using a reserved bandwidth of an egress port of the intermediate device;
receiving return probe packets returned by the destination device, wherein the return probe packets correspond to the forward probe packets received by the destination device; and
sending, by the transmit end device, one data packet each time one return probe packet is received, wherein the data packet arrives at the destination device after being forwarded by the intermediate device by using a link bandwidth other than the reserved bandwidth of the egress port of the intermediate device.

36. The method according to claim 35, further comprising:
periodically adjusting, by the transmit end device, a sending rate of the forward probe packets in a next period based on a packet loss rate of the forward probe packets in one period, wherein the packet loss rate of the forward probe packets is obtained by the transmit end device through calculation based on a quantity of the return probe packets received by the transmit end device and a quantity of the sent forward probe packets in the period.

37. The method according to claim 36, wherein periodically adjusting the sending rate of the forward probe packets based on the packet loss rate of the forward probe packets comprises:
comparing a packet loss rate of the forward probe packets with a target packet loss rate in a current period, and
performing different rate adjustment on the sending rate of the forward probe packets based on a comparing result.

38. The congestion control method according to claim 37, wherein performing the different rate adjustment on the sending rate of the forward probe packets based on the comparing result comprises:
when the packet loss rate of the forward probe packets is lower than the target packet loss rate, increasing the sending rate of the forward probe packets in the next period; and
when the packet loss rate of the forward probe packets is higher than the target packet loss rate, decreasing the sending rate of the forward probe packets in the next period.

39. The method according to claim 38, wherein
increasing the sending rate of the forward probe packets in the next period comprises: calculating the sending rate of the probe packets in the next period according to a formula:

next_rate=cur_rate×[1+(tar_loss−cur-loss)×(max_rate−cur_rate)/cur_rate]; and decreasing the sending rate of the forward probe packets in the next period comprises: calculating the sending rate of the probe packets in the next period according to a formula:

next_rate=cur_rate×[1−(cur_loss−tar_loss)×max_rate/(max_rate−cur_rate)], wherein cur_rate is a probe packet sending rate in the current period, next_rate is a preset probe packet sending rate in the next period, tar_loss is the target packet loss rate of the probe packets, cur_loss is the packet loss rate of the probe packets in the current period, and max_rate is a maximum sending rate allowed in the network.

40. A network congestion control device, comprising:
a processor; and
a memory coupled to the processor to store instructions, which when executed by the processor, cause the processor to perform operations, the operations including:
sending forward probe packets to a destination device at a preset initialized rate, wherein some or all of the forward probe packets arrive at the destination device after being rate-limited forwarded by an intermediate device in a network by using a reserved bandwidth of an egress port of the intermediate device;
receiving return probe packets returned by the destination device, wherein the return probe packets correspond to the forward probe packets received by the destination device;
determining a data packet sending rate based on the received return probe packets; and
sending one data packet each time one return probe packet is received, wherein the data packet arrives at the destination device after being forwarded by the intermediate device by using a link bandwidth other than the reserved bandwidth of an egress port of the intermediate device.

41. The network congestion control device according to claim 40, wherein the operations further include:
periodically adjusting a sending rate of the forward probe packets in a next period based on a packet loss rate.

42. The network congestion control device according to claim 41, wherein periodically adjusting the sending rate of the forward probe packets in the next period comprises:
comparing a packet loss rate of the probe packets with a target packet loss rate in a current period; and
adjusting a sending rate of to-be-sent probe packets in the next period based on a comparing result.

* * * * *